United States Patent
Sato

(10) Patent No.: US 9,769,832 B2
(45) Date of Patent: Sep. 19, 2017

(54) INFORMATION PROCESSING APPARATUS, WIRELESS COMMUNICATION APPARATUS, AND INFORMATION PROCESSING METHOD

(71) Applicant: Sony Corporation, Tokyo (JP)

(72) Inventor: Masanori Sato, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/383,133

(22) PCT Filed: Dec. 12, 2012

(86) PCT No.: PCT/JP2012/082170
§ 371 (c)(1),
(2) Date: Sep. 5, 2014

(87) PCT Pub. No.: WO2013/136613
PCT Pub. Date: Sep. 19, 2013

(65) Prior Publication Data
US 2015/0334718 A1    Nov. 19, 2015

(30) Foreign Application Priority Data

Mar. 16, 2012  (JP) .............................. 2012-060371

(51) Int. Cl.
*H04W 72/00* (2009.01)
*H04W 72/04* (2009.01)
(Continued)

(52) U.S. Cl.
CPC ......... *H04W 72/0493* (2013.01); *H04M 3/38* (2013.01); *H04W 4/005* (2013.01);
(Continued)

(58) Field of Classification Search
None
See application file for complete search history.

(56) References Cited

U.S. PATENT DOCUMENTS 8,606,232 B2 *  12/2013  Siu .................. H04W 8/205
                                                 455/411
9,357,393 B2 *   5/2016  Ehara .............. H04W 12/08
(Continued)

FOREIGN PATENT DOCUMENTS

JP    2002-369174 A    12/2002
JP    2003-099658 A     4/2003
(Continued)

OTHER PUBLICATIONS

No Author Listed, Feasibility study on the security aspects of remote provisioning and change of subscription for machine to machine (m2m) equipment. 3$^{rd}$ Generation Partnership Project; Technical Specification Group Services and System Aspects. Jun. 2010; V9.2.0:1-87.

(Continued)

*Primary Examiner* — Brian D Nguyen
*Assistant Examiner* — Deepa Belur
(74) *Attorney, Agent, or Firm* — Chip Law Group

(57) ABSTRACT

A proper communication service is provided according to use by a user.

An information processing apparatus includes a selection unit and a control unit. Based on a request from a wireless communication apparatus, the selection unit selects a connection right that has to be set to be in the wireless communication apparatus, from among multiple types of connection rights for connecting to a predetermined network using a wireless communication. The control unit controls a wireless communication service relating to the request, which is performed between the information processing apparatus and the wireless communication apparatus after the connection right that is selected by the selection unit is set to be in the wireless communication apparatus.

14 Claims, 22 Drawing Sheets

(51) Int. Cl.
  *H04W 8/18* (2009.01)
  *H04M 3/38* (2006.01)
  *H04W 76/02* (2009.01)
  *H04W 4/00* (2009.01)
  *H04W 12/08* (2009.01)

(52) U.S. Cl.
  CPC ............. *H04W 8/18* (2013.01); *H04W 12/08* (2013.01); *H04W 76/02* (2013.01)

(56) References Cited

U.S. PATENT DOCUMENTS

| | | | | |
|---|---|---|---|---|
| 2006/0079231 | A1* | 4/2006 | Jeong | G06F 21/31 455/434 |
| 2010/0159974 | A1 | 6/2010 | Katayama | |
| 2012/0135713 | A1* | 5/2012 | Lee | H04W 8/02 455/411 |
| 2012/0190354 | A1* | 7/2012 | Merrien | H04W 4/001 455/422.1 |
| 2012/0304314 | A1* | 11/2012 | Atzkern | G06F 21/105 726/29 |
| 2013/0167196 | A1* | 6/2013 | Spencer | H04W 8/22 726/3 |
| 2013/0182554 | A1* | 7/2013 | Poon | H04W 24/04 370/216 |
| 2013/0304616 | A1* | 11/2013 | Raleigh | G06Q 20/145 705/34 |
| 2014/0089478 | A1* | 3/2014 | Seed | H04W 4/001 709/222 |
| 2014/0094182 | A1* | 4/2014 | Sato | H04L 63/105 455/450 |
| 2014/0165173 | A1* | 6/2014 | Hjelm | H04L 63/08 726/7 |
| 2014/0220939 | A1* | 8/2014 | Takae | H04W 12/08 455/411 |
| 2014/0351952 | A1* | 11/2014 | Gopu | H04L 63/10 726/27 |

FOREIGN PATENT DOCUMENTS

| | | |
|---|---|---|
| JP | 2004-023693 A | 1/2004 |
| JP | 2006-067359 A | 3/2006 |
| JP | 2007-104282 A | 4/2007 |
| JP | 2007-116209 A | 5/2007 |
| JP | 2012-054984 A | 3/2012 |
| WO | 2009/002236 A | 12/2008 |
| WO | 2012/023214 A | 2/2012 |
| WO | 2012023213 A1 | 2/2012 |

OTHER PUBLICATIONS

European Extended Search Report received for European Patent Application No. 12871106.6, mailed on Mar. 1, 2016, p. 13.
Office Action received for Chinese Patent Application No. 2012-80071272.X, mailed on Mar. 22, 2016, 21 pages of office action including 12 pages of English translation.
Office Action received for Japanese Patent Application No. 2014-504635, mailed on Mar. 22, 2016, 4 pages of office action.
Partial European Search Report issued on Dec. 1, 2015 in Patent Application 12871106.6.
Office Action for JP Patent Application No. 2016-151415, issued on Jul. 18, 2017, 6 pages of Office Action and 3 pages of English Translation.

* cited by examiner

FIG. 1
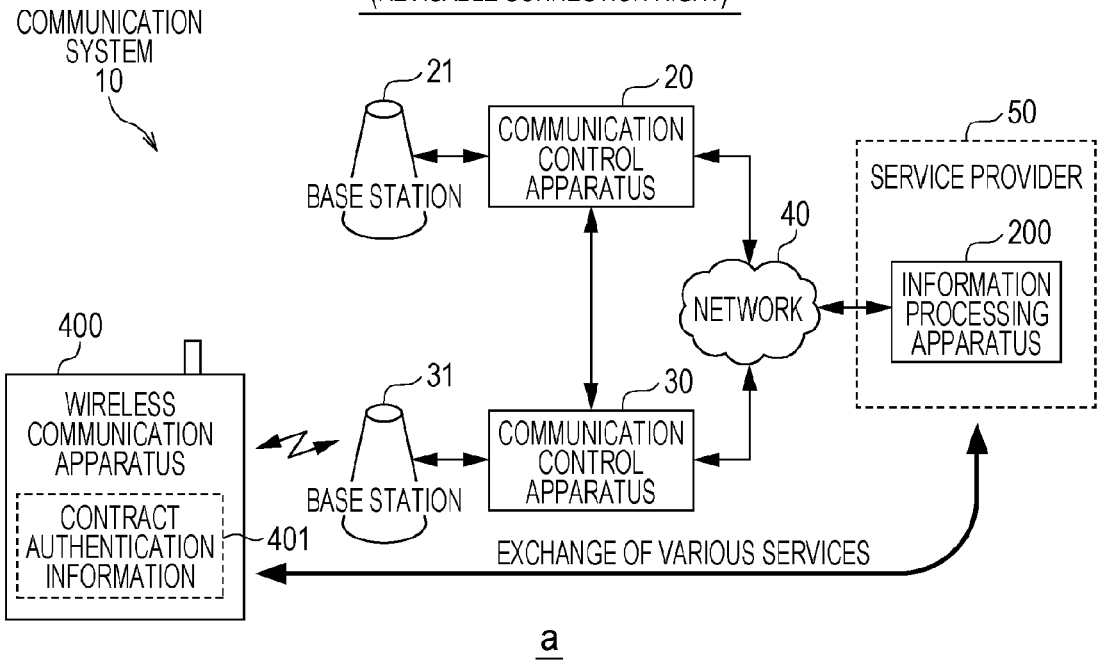
a
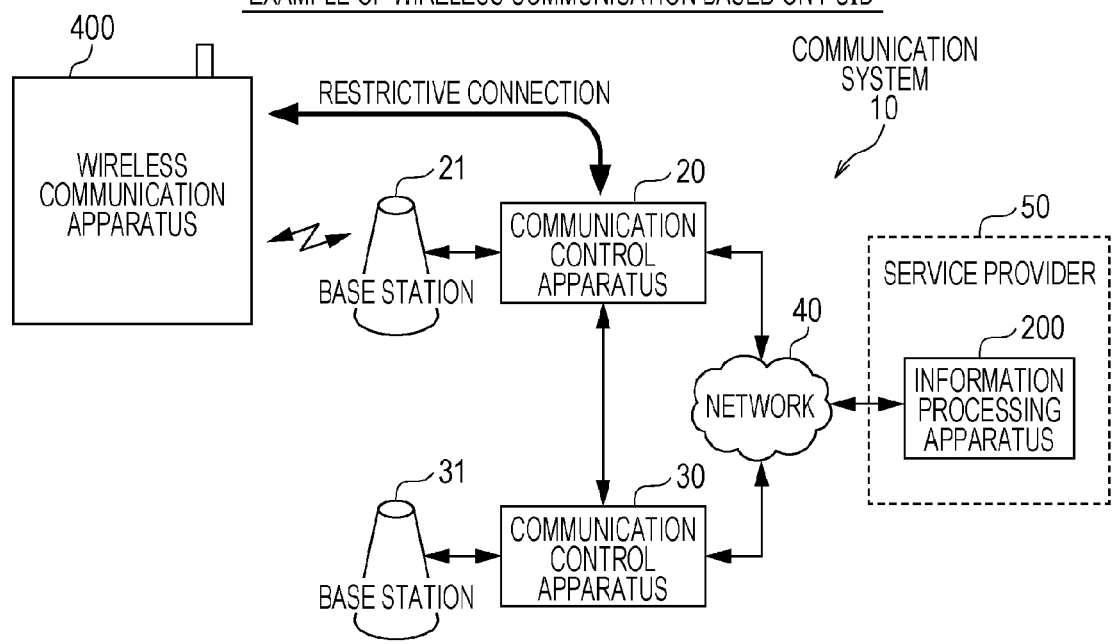
b

FIG. 4

SERVICE MANAGEMENT DATABASE 240

| | USER ID 241 | PASSWORD 242 | TERMINAL IDENTIFICATION INFORMATION 243 | USAGE INFORMATION 244 | | | | |
|---|---|---|---|---|---|---|---|---|
| | | | | DATE AND TIME OF USE | NUMBER OF TIMES THAT SERVICE HAS BEEN USED FOR THE PAST ONE YEAR | INFORMATION ON PAST PURCHASE HISTORY | POINT | CONTRACT INFORMATION |
| 1 | 1452 | 2233 | AAAA | ⋮ | 34 | ⋮ | 100 | ⋮ |
| 2 | 5432 | 5768 | BBBB | ⋮ | 67 | ⋮ | 678 | ⋮ |
| 3 | 5678 | 8907 | CCCC | ⋮ | 84 | ⋮ | 179 | ⋮ |
| ⋯ | ⋯ | ⋯ | ⋯ | ⋯ | ⋯ | ⋯ | ⋯ | ⋯ |

FIG. 5

CONTRACT AUTHENTICATION INFORMATION MANAGEMENT DATABASE 250

| CONTRACT AUTHENTICATION INFORMATION MANAGEMENT NO (251) | MAXIMUM CONNECTION SPEED (252) | PRIORITY CONNECTION RIGHT (253) | USAGE STATE (254) | ALLOCATION DESTINATION (255) |
|---|---|---|---|---|
| 1 | 400 Kbps | × | IN USE | AAAA |
| 2 | 400 Kbps | × | — | — |
| 3 | 10 Mbps | ○ | IN USE | BBBB |
| 4 | 10 Mbps | × | — | — |
| ⋮ | ⋮ | ⋮ | ⋮ | ⋮ | a

CONTRACT AUTHENTICATION INFORMATION MANAGEMENT DATABASE 250

| CONTRACT AUTHENTICATION INFORMATION MANAGEMENT NO (251) | MAXIMUM CONNECTION SPEED (252) | PRIORITY CONNECTION RIGHT (253) | USAGE STATE (254) | ALLOCATION DESTINATION (255) |
|---|---|---|---|---|
| 1 | 400 Kbps | × | IN USE | AAAA |
| 2 | 400 Kbps | × | — | — |
| 3 | 10 Mbps | ○ | IN USE | BBBB |
| 4 | 10 Mbps | × | IN USE | CCCC |
| ⋮ | ⋮ | ⋮ | ⋮ | ⋮ | b

FIG. 7

DEVICE MANAGEMENT
DATABASE
330

| | SERVICE IDENTIFICATION INFORMATION 331 | TERMINAL IDENTIFICATION INFORMATION 332 | CONTRACT AUTHENTICATION INFORMATION ALLOCATION INFORMATION 333 |
|---|---|---|---|
| 1 | G001 | AAAA | 1 |
| 2 | G001 | BBBB | 3 |
| 3 | — | — | — |
| ⋮ | ⋮ | ⋮ | ⋮ | a

DEVICE MANAGEMENT
DATABASE
330

| | SERVICE IDENTIFICATION INFORMATION 331 | TERMINAL IDENTIFICATION INFORMATION 332 | CONTRACT AUTHENTICATION INFORMATION ALLOCATION INFORMATION 333 |
|---|---|---|---|
| 1 | G001 | AAAA | 1 |
| 2 | G001 | BBBB | 3 |
| 3 | G001 | CCCC | 4 |
| ⋮ | ⋮ | ⋮ | ⋮ | b

FIG. 8

CONTRACT AUTHENTICATION INFORMATION MANAGEMENT DATABASE 340

| | CONTRACT AUTHENTICATION INFORMATION IDENTIFICATION INFORMATION 341 | TERMINAL IDENTIFICATION INFORMATION 342 |
|---|---|---|
| 1 | 123450000000001 | NOT IN USE |
| 2 | 123450000000002 | AAAA |
| 3 | 123450000000003 | NOT IN USE |
| 4 | 123450000000004 | BBBB |
| 5 | 123450000000005 | NOT IN USE |
| ⋮ | ⋮ | ⋮ | a

CONTRACT AUTHENTICATION INFORMATION MANAGEMENT DATABASE 340

| | CONTRACT AUTHENTICATION INFORMATION IDENTIFICATION INFORMATION 341 | TERMINAL IDENTIFICATION INFORMATION 342 |
|---|---|---|
| 1 | 123450000000001 | CCCC |
| 2 | 123450000000002 | AAAA |
| 3 | 123450000000003 | NOT IN USE |
| 4 | 123450000000004 | BBBB |
| 5 | 123450000000005 | NOT IN USE |
| ⋮ | ⋮ | ⋮ | b

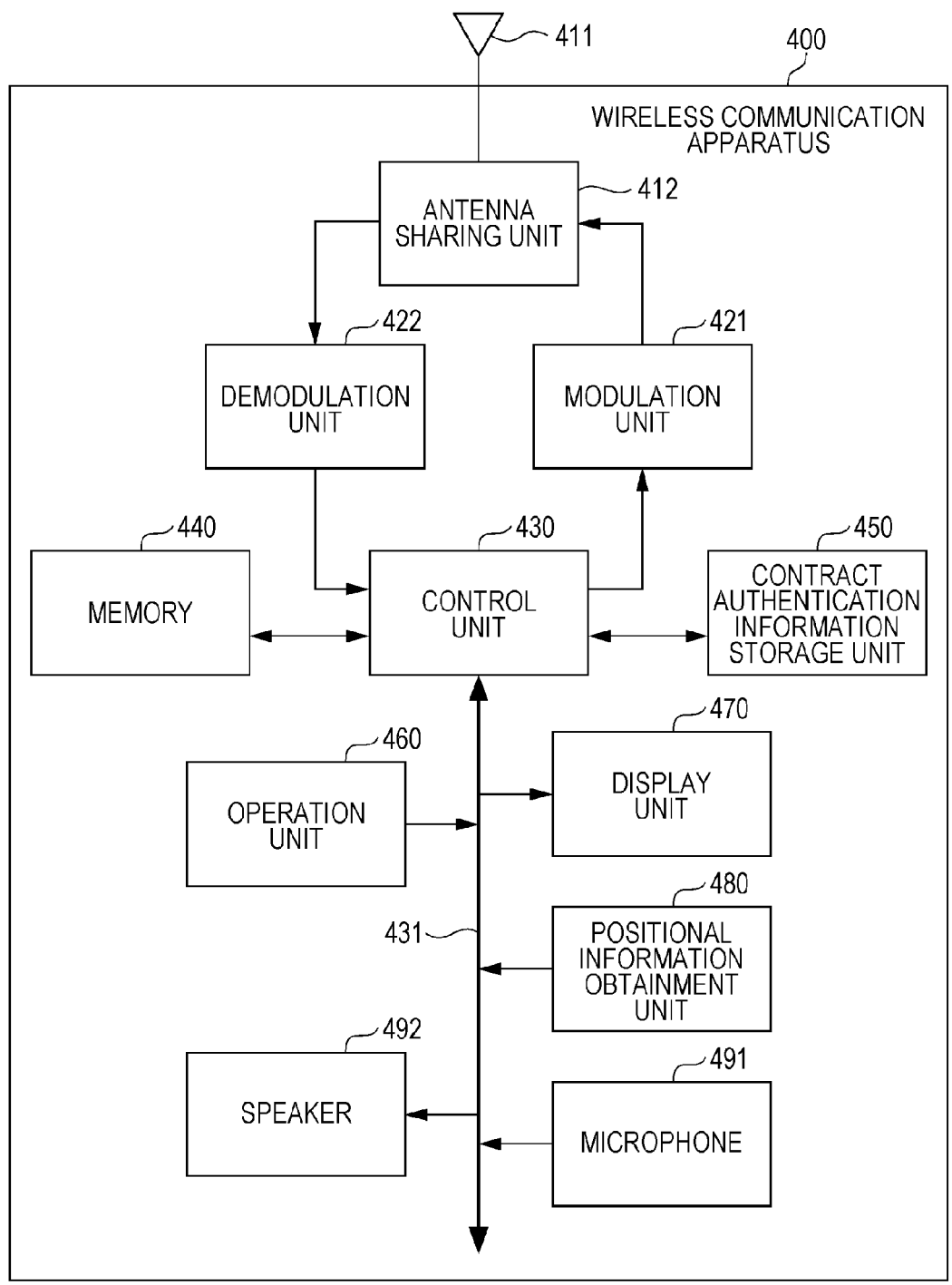

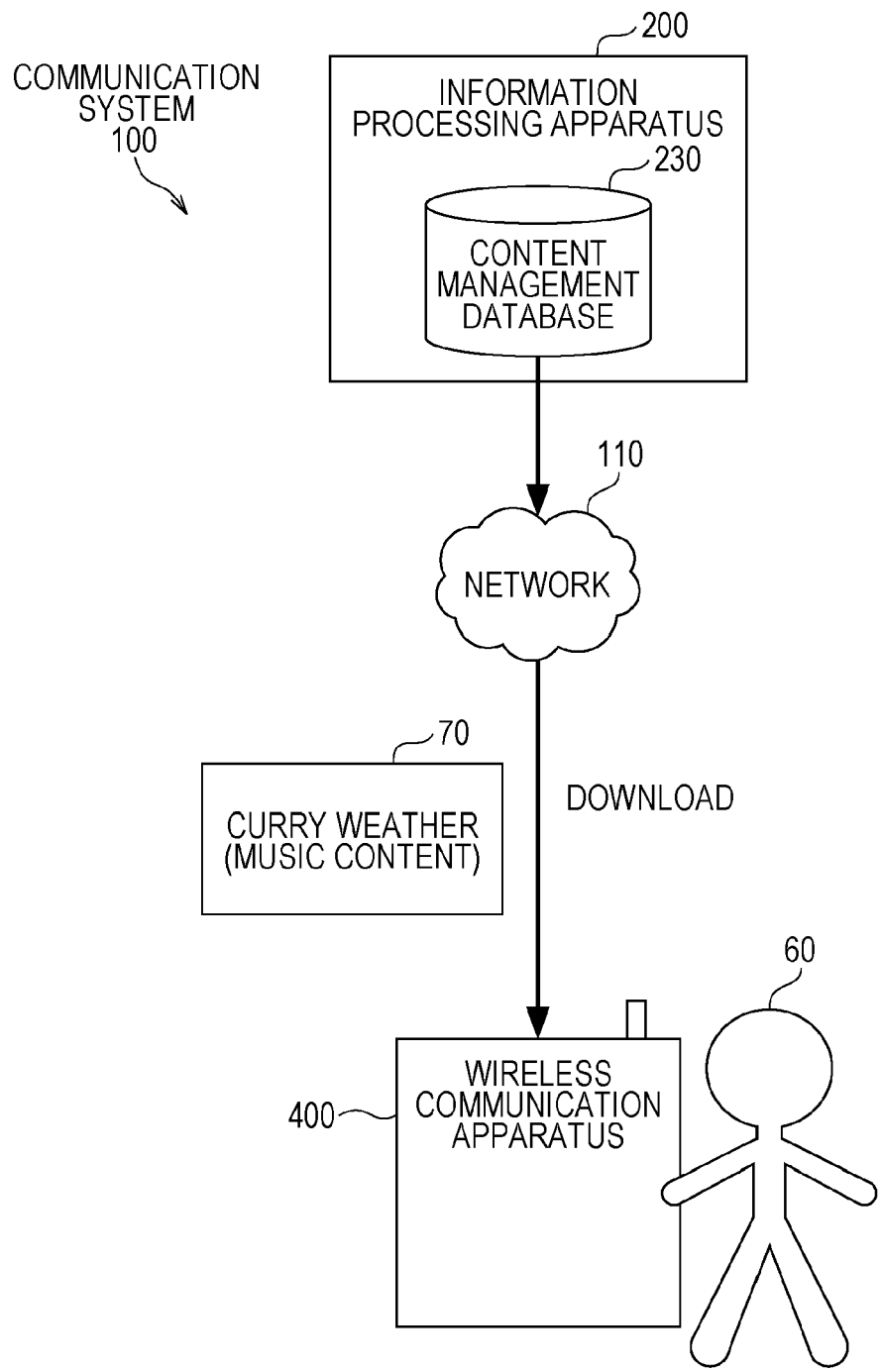

INFORMATION PROCESSING APPARATUS, WIRELESS COMMUNICATION APPARATUS, AND INFORMATION PROCESSING METHOD

TECHNICAL FIELD

The present technology relates to an information processing apparatus, and particularly to an information processing apparatus for, a wireless communication apparatus for, and an information processing method of connecting to a network.

BACKGROUND ART

Functional extension is currently under discussion in the 3rd Generation Partnership Project (3GPP) (for example, refer to NPL 1) that formulates technical specifications for public wireless communication networks.

A method with flexibly using information indicating availability of a service is possible with the functional extension (called machine-to-machine equipment). The information indicating the availability of the service is contract authentication information (for example, a revisable connection right). For example, the contract authentication information can be downloaded, the downloading can be temporarily stopped, or the downloading can be resumed, over a network.

Furthermore, currently, the contract authentication information needs to be retained in a physical device called a subscriber identity module (SIM) card. However, a retention method is also made flexible by dealing with the contract authentication information in software.

CITATION LIST

Non Patent Literature

NPL 1: 3GPP TR 33.812 V9.2.0 (2010-06)

SUMMARY OF INVENTION

Technical Problem

A method of using the contract authentication information different than that in the related art is considered by using the functional extension described above.

For example, user's own wireless communication apparatus's easy receiving of a desired communication service from a service provider that provides various communication services provides a user with convenience. Furthermore, the service provider also can have an opportunity to provide various communication services.

An object of the present technology that is invented in view of such a situation is to provide a proper communication service according to use by a user.

Solution to Problem

According to a first aspect of the present technology whose purpose is to solve the problems described above, there are provided an information processing apparatus, an information processing method for use in the information processing apparatus, and a program causing a computer to execute the information processing method, the information processing apparatus including: a selection unit that, based on a request from a wireless communication apparatus, selects a connection right that has to be set to be in the wireless communication apparatus, from among multiple types of connection rights for connecting to a predetermined network using a wireless communication; and a control unit that controls a wireless communication service relating to the request, which is performed between the information processing apparatus and the wireless communication apparatus after the selected connection right is set to be in the wireless communication apparatus. Accordingly, after the connection right that has to be set to be in the wireless communication apparatus is selected from among the multiple types of connection rights, and the selected connection right is set to be in the wireless communication apparatus, an operation is caused to occur in which the wireless communication service that is performed between the information processing apparatus and the wireless communication apparatus is controlled.

In the first aspect, the selection unit may select the connection right that has to be set to be in the wireless communication apparatus based on predetermined information relating to the wireless communication apparatus if the request from the wireless communication apparatus is received. Accordingly, an operation is caused to occur in which if the request is received from the wireless communication apparatus, the connection right that has to be set to be in the wireless communication apparatus is selected based on the predetermined information relating to the wireless communication apparatus.

Furthermore, in the first aspect, the selection unit may select the connection right that has to be set to be in the wireless communication apparatus, using history information on past purchases by a user of the wireless communication apparatus as the predetermined information. Accordingly, an operation is caused to occur in which the connection right that has to be set to be in the wireless communication apparatus is selected using the history information on the past purchases by the user of the wireless communication apparatus.

Furthermore, in the first aspect, the selection unit may select the connection right that has to be set to be in the wireless communication apparatus, using information relating to a usage state of the wireless communication apparatus as the predetermined information. Accordingly, an operation is caused to occur in which the connection right that has to be set to be in the wireless communication apparatus is selected using the information relating to the usage state of the wireless communication apparatus.

Furthermore, in the first aspect, the selection unit may select the connection right that has to be set to be in the wireless communication apparatus, using information relating to a contract condition for the wireless communication apparatus as the predetermined information. Accordingly, an operation is caused to occur in which the connection right that has to be set to be in the wireless communication apparatus is selected using the information relating to the contract condition for the wireless communication apparatus.

Furthermore, in the first aspect, the selection unit may select the connection right that has to be set to be in the wireless communication apparatus, using information relating to points that are owned by a user of the wireless communication apparatus, as the predetermined information. Accordingly, an operation is caused to occur in which the connection right that has to be set to be in the wireless communication apparatus is selected using the information relating to the points that are owned by the user of the wireless communication apparatus.

Furthermore, in the first aspect, the selection unit may select the connection right that has to be set to be in the wireless communication apparatus, using information relating to a maximum connection speed available for the connection right that is pre-set to be in the wireless communication apparatus, as the predetermined information. Accordingly, an operation is caused to occur in which the connection right that has to be set to be in the wireless communication apparatus is selected using the information relating to the maximum connection speed available for the connection right that is pre-set to be in the wireless communication apparatus.

Furthermore, in the first aspect, the selection unit may select the connection right that has to be set to be in the wireless communication apparatus, using information relating to a communication environment of the wireless communication apparatus as the predetermined information. Accordingly, an operation is caused to occur in which the connection right that has to be set to be in the wireless communication apparatus is selected using information relating to a communication environment of the wireless communication apparatus.

Furthermore, in the first aspect, the selection unit may determine whether the connection right is set to be in the wireless communication apparatus, based on a result of comparing the time from the setting of the connection right to be in the wireless communication apparatus and to invalidation of the connection right and the time of the wireless communication service to the wireless communication apparatus. Accordingly, an operation is caused to occur in which it is determined whether the connection right is set to be in the wireless communication apparatus, based on the result of comparing the time from the setting of the connection right to be in the wireless communication apparatus and to invalidation of the connection right and the time of the wireless communication service, to the wireless communication apparatus.

Furthermore, in the first aspect, the multiple types of connection rights may be multiple types of connection rights that are different in a condition for use. Accordingly, an operation is caused to occur in which multiple types of connection rights that are different in a condition for use are used as the multiple types of connection rights.

Furthermore, in the first aspect, the control unit may perform control for outputting an evaluation value from the wireless communication apparatus if the wireless communication service relating to the request is performed with each of the multiple types of connection rights. Accordingly, an operation is caused to occur in which the evaluation value is output from the wireless communication apparatus if the wireless communication service relating to the request is performed with each of the multiple types of connection rights.

Furthermore, in the first aspect, the selection unit may select the connection right selected by the user based on the evaluation value that is output, as the connection right that has to be set to be in the wireless communication apparatus. Accordingly, an operation is caused to occur in which the connection right selected by the user based on the evaluation value that is output is selected as the connection right that has to be set to be in the wireless communication apparatus.

Furthermore, according to a second aspect of the present technology, there are provided a wireless communication apparatus, a method of controlling the wireless communication apparatus, and a program for causing a computer to execute the method, the wireless communication apparatus including: a transmission control unit that requests an information processing apparatus to provide a predetermined wireless communication service; and a control unit that sets a connection right that is selected from among multiple types of connection rights for connecting to a predetermined network using wireless communication, based on the request, and that performs control for performing the wireless communication service that is performed between the wireless communication apparatus and the information processing apparatus. Accordingly, operations are caused to occur in which an information processing apparatus is requested to provide a predetermined wireless communication service, the connection right that is selected from among multiple types of connection rights based on the request is set, and control is performed for performing the wireless communication service that is performed between the wireless communication apparatus and the information processing apparatus.

Advantageous Effects of Invention

According to the present technology, an outstanding effect is accomplished in which a proper communication service can be provided according to use by the user.

BRIEF DESCRIPTION OF DRAWINGS

FIG. 1 is a block diagram illustrating a system configuration example of a communication system 10 according to a first embodiment of the present technology.

FIG. 4 is a diagram schematically illustrating a service management database 240 according to the first embodiment of the present technology.

FIG. 5 is a diagram schematically illustrating a contract authentication information management database 250 according to the first embodiment of the present technology.

FIG. 7 is a diagram schematically illustrating a device management database 330 according to the first embodiment of the present technology.

FIG. 8 is a diagram schematically illustrating a contract authentication information management database 340 according to the first embodiment of the present technology.

FIG. 9 is a block diagram illustrating an internal configuration example of a wireless communication apparatus 400 according to the first embodiment of the present technology.

FIG. 10 is a diagram illustrating a simplified example of use of the wireless communication apparatus 400 according to the first embodiment of the present technology.

DESCRIPTION OF EMBODIMENTS

Figure 2:
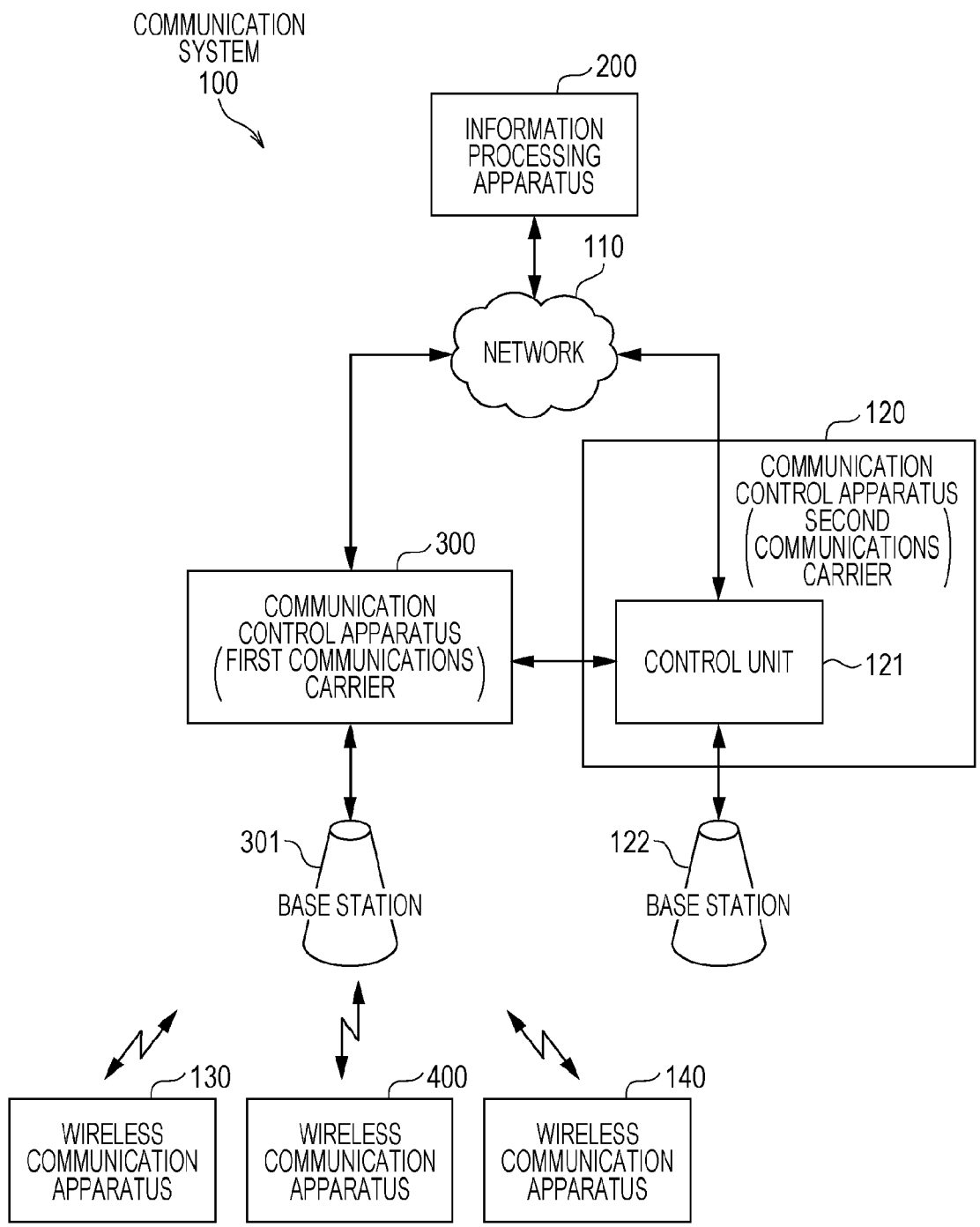
FIG. 2 is a block diagram illustrating a system configuration example of a communication system 100 according to the first embodiment of the present technology.

Embodiments according to the present technology (hereinafter referred to as embodiments) are described below. Descriptions are provided in the following order.
1. First Embodiment (Communication Control: an example in which a Connection Right Selected From among Multiple Types of Connection Rights is set to be in a Wireless Communication Apparatus and thus Communication is Performed)
2. Modification Example 1. First Embodiment

[Configuration Example of a Communication System]
FIG. 1 is a block diagram illustrating a system configuration example of a communication system 10 according to the first embodiment of the present technology. FIG. 1 is a configuration example of a communication system that is premised on a network configuration in which a network is configured from a communication control apparatus 30 to which only a wireless communication apparatus retaining valid contract authentication information can be connected, and a communication control apparatus 20 to which the wireless communication apparatus not having the valid contract authentication information also can be connected.

FIG. 1a illustrates an example of wireless communication in a case where a wireless communication apparatus 400 retains valid contract authentication information 401. Furthermore, FIG. 1b illustrates an example of the wireless communication in a case where the wireless communication apparatus 400 does not retain the valid contract authentication information 401.

At this point, contract authentication information, for example, is information that includes telephone subscriber information and authentication information, and is information for setting a revisable connection right. The contract authentication information, for example, is not limited to a specific communications carrier (for example, a mobile phone carrier) at the time of purchasing a device, and is contract authentication information (so-called soft SIM) that can be flexibly set by the communications carrier after purchasing the device. Furthermore, revisability of the contract authentication information over a network makes it easy to separate selling of a portable telephone and selecting of the communications carrier and makes it possible to easily share the contract authentication information among multiple wireless communication apparatuses. Furthermore, a case where the contract authentication information is not retained means, for example, a case where the contract authentication information itself is not retained, or a case where only the contract authentication information invalidated by invalidation processing of the contract authentication information is retained. The contract authentication information corresponds to, for example, a machine communication identity module (MCIM) (for example, refer to NPL 1).

Furthermore, for example, if the valid contract authentication information is retained, this can be understood as a case where the connection right (the revisable connection right) for connecting to a network 40 using the wireless communication is retained. That is, the connection right is a right to connect to a base station based on the contract authentication information for connecting to the base station that is operated by the communications carrier.

The communication system 10 includes the communication control apparatuses 20 and 30, base stations 21 and 31, the network 40, the information processing apparatus 200, and the wireless communication apparatus 400.

At this point, the communication control apparatus 20 and the communication control apparatus 30 are illustrated as playing logical roles, and are assumed to be operated by different business operators, but may be assumed also to be operated by the same business operator. Furthermore, two or more communication control apparatuses 20 and two or more communication control apparatuses 30 may be assumed to be present. Furthermore, each of the communication control apparatus 20 and the communication control apparatus 30 may be configured as one piece as an information processing apparatus, and may be configured from multiple apparatuses. At this point, the communication control apparatus 20 and the communication control apparatus 30 are meant to play relative roles if the wireless communication apparatus having the valid contract authentication information is assumed to serve as a reference. For this reason, one wireless communication apparatus is equivalent to the communication control apparatus 20, but there is also a likelihood that the other wireless communication apparatus will be equivalent to the communication control apparatus 30.

Moreover, the communication control apparatus 20, for example, is equivalent to a registration operator (RO), and the communication control apparatus 30, for example, is equivalent to a selected home operator (SHO) (for example, refer to NPL 1). That is, the communication system that is configured from the communication control apparatus 20 and the communication control apparatus 30, for example, is equivalent to the communication system that is assumed in the network configuration in which the network is configured from the SHO and the RO (for example, refer to NPL 1).

The wireless communication apparatus 400, for example, is a portable telephone apparatus (for example, a smart phone that has a call function and a data communication function. The wireless communication apparatus 400 is one example of the information processing apparatus in which the software downloadable subscriber identity module (SIM) can be used. Furthermore, application to a different wireless communication apparatus in which the software downloadable SIM can be used is possible as well. For example, application to an imaging apparatus (for example, a digital camera and a digital video camera (for example, a camera-integrated recorder) that has a wireless communication function and to a sound output apparatus (for example, a portable music player) that has the wireless communication function) is possible. Furthermore, application to a display apparatus (for example, a digital photograph frame) that has the wireless communication function and to an electronic book display apparatus that has the wireless communication function is possible. Furthermore, for example, application to an information processing apparatus (for example, a personal computer that does not have the wireless communication function) that can perform the wireless communication by being equipped with a wireless communication device having the wireless communication function is possible as well.

As illustrated in FIG. 1a, if the wireless communication apparatus 400 retains the valid contract authentication information 401, based on the contract authentication information 401, the wireless communication apparatus 400 can connect to the communication control apparatus 30 through a base station 31. In contrast, as illustrated in FIG. 1b, if the wireless communication apparatus 400 does not retain the valid contract authentication information 401, the wireless communication apparatus 400 cannot connect to the communication control apparatus 30. However, in this case, based on a provisional connectivity identity (PCID), the wireless communication apparatus 400 can connect to the communication control apparatus 20 through a base station 21.

At this point, the PCID is an identifier for connecting to the communication control apparatus 20, and is assigned to all the wireless communication apparatuses (devices) each of which has a construction such as the software downloadable SIM.

The network 40 is a network such as a telephone network, or the Internet (for example, a public line network). Furthermore, the network 40 and the communication control apparatus 30 are connected to each other through a gateway (not illustrated). In the same manner, the network 40 and the communication control apparatus 20 are connected to each other though the gateway (not illustrated).

The communication control apparatus 20 is a communication control apparatus that is managed by a wireless communications carrier that provides a service such as an initial connection registration. The communication control apparatus 20, for example, corresponds to the wireless communications carrier (for example, the mobile phone carrier) that provides a wireless connection service. Further-more, the communication control apparatus 20 includes a control unit (which is equivalent to a control unit 121 illustrated in FIG. 2).

The control unit of the communication control apparatus 20 performs authentication control of the wireless communication apparatus that is connected through the base station 21. For example, in the wireless communication apparatus that is connected through the base station 21, the control unit of the communication control apparatus 20 performs authentication, based on the PCID. Then, the communication control apparatus 20 provides the authenticated wireless communication apparatus with a service, such as the initial connection registration. Furthermore, the control unit of the communication control apparatus 20 is connected to the communication control apparatus 30, and exchanges various pieces of information between the communication control apparatus 20 and the communication control apparatus 30.

The base station 21 is a mobile communication base station (NodeB) that connects the wireless communication apparatus 400 and the communication control apparatus 20 through the wireless line.

The communication control apparatus 30 is a communication control apparatus that is managed by the wireless communications carrier that provides the wireless connection service. The communication control apparatus 30 provides an Internet-based service and the like, and for example, corresponds to the wireless communications carrier (for example, the mobile phone carrier) that provides the wireless connection service. Furthermore, the communication control apparatus 30 includes a control unit (which is equivalent to a control unit 320 illustrated in FIG. 6).

The control unit of the communication control apparatus 30 performs authentication control of the wireless communication apparatus that is connected through the base station 31. For example, the control unit of the communication control apparatus 30 authenticates the wireless communication apparatus that retains the valid contract authentication information provided by the communication control apparatus 30, among the wireless communication apparatuses that are connected through the base station 31. Then, the communication control apparatus 30 connects the authenticated wireless communication apparatus to the network 40 through the gateway (not illustrated).

Furthermore, the control unit of the communication control apparatus 30 is connected to the communication control apparatus 20, and exchanges various pieces of information between the communication control apparatus 30 and the communication control apparatus 20. At this point, the wireless communication apparatus that does not retain the valid contract authentication information can connect (restrictively connect) to the communication control apparatus 20 through the communication control apparatus 30, based on the PCID of that wireless communication apparatus.

The base station 31 is a mobile communication base station (NodeB) that connects the wireless communication apparatus 400 and the communication control apparatus 30 through the wireless line.

A service provider 50 is a service provider (SP) that provides various communication services, such as a mail order sale, an online game, a content retention service, and a content delivery service. Furthermore, the service provider 50 includes an information processing apparatus 200 for providing these communication services. Furthermore, the information processing apparatus 200 is connected to the communication control apparatus 20 and the communication control apparatus 30 through the network 40. At this point, an operator that provides various communication services is assumed to be the communications carrier that provides the wireless connection services, a mobile virtual network operator (MVNO) (a so-called business-running operator that is called a virtual communications carrier) or the like.

The information processing apparatus 200 is an information processing apparatus that provides the various communication services over the network 40, and provides the various communication services to the wireless communication apparatus 400 using the wireless communication. For example, the information processing apparatus 200 provides the communication services, such as a web service, a data download service, a data upload service, an online game, and the like.

For example, as illustrated in FIG. 1a, if the wireless communication apparatus 400 retains the valid contract authentication information 401, based on the valid contract authentication information 401, the wireless communication apparatus 400 is connected to the base station 31 through the wireless line and is connected to the communication control apparatus 30 through the base station 31. In this case, the wireless communication apparatus 400 is connected to the communication control apparatus 30 through the base station 31, and can be provided with the various services (for example, download of content) from the information processing apparatus 200. Furthermore, if the wireless communication apparatus 400 that retains the valid contract authentication information 401 connects to the communication control apparatus 20, the wireless communication apparatus 400 is connected to the communication control apparatus 20 through the communication control apparatus 30.

Furthermore, as illustrated in FIG. 1b, if the wireless communication apparatus 400 does not retain the valid contract authentication information 401, based on the PCID being retained, the wireless communication apparatus 400 can be connected (limitedly connected) to the communication control apparatus 20 though the base station 21. In this case, the wireless communication apparatus 400 is connected (restrictively connected) to the communication control apparatus 20 through the base station 21, but can perform only the restrictive communication (for example, download of the contract authentication information, validation/invalidation of the contract authentication information).

Moreover, if the wireless communication apparatus 400 does not retain the valid contract authentication information 401, the wireless communication apparatus 400 can be connected to either of the base stations 21 and 31 according to a position in which the wireless communication apparatus 400 is used, and is connected to the communication control apparatus 20 through these base stations.

In this manner, the wireless communication apparatus 400 that does not retain the valid contract authentication information 401 cannot be provided with the various services from the information processing apparatus 200. That is, the wireless communication apparatus 400 (wireless communication apparatus 400 that does not retain the valid contract authentication information 401) that does not retain the revisable connection right can be understood as the device that is connected in a service-restricted manner. In contrast, the wireless communication apparatus (wireless communication apparatus 400 that retains the valid contract authentication information 401) that retains the revisable connection right can be understood as the device that is involved in a service connection (normal connection). Moreover, the wireless communication apparatus 400 that does not retain the revisable connection right obtains (for example, downloads the contract authentication information, or validates the contract authentication information) the valid contract authentication information 401 through the communication control apparatus 20, and thus can be connected to the communication control apparatus 30.

In this manner, if a user that owns the wireless communication apparatus 400 does not enter into a contract for the contract authentication information with the communications carrier that operates the communication control apparatus 30, the user cannot be provided with the various services from the information processing apparatus 200.

However, it is also assumed that even though the user does not enter into the contact for the contract authentication information with the communications carrier that operates the communication control apparatus 30, the user who owns the wireless communication apparatus 400 expects to be provided with the various services from the information processing apparatus 200 in a restrictive manner. Furthermore, it is also assumed that, even though the service provider 50 bears a communication cost relating to the various services, the service provider 50 expects to provide the user, who expects to be provided with the various services from the information processing apparatus 200, with the various services.

At this point, for example, it is assumed that the service provider 50 is a service provider which provides an electronic book. In this case, for example, it is considered that the service provider 50 grants the connection right (for example, the connection right based on the contract authentication information) to the wireless communication apparatus that provides the service. In this manner, the granting of the connection right to each wireless communication apparatus makes it possible for each wireless communication apparatus to connect to the network 40 without the user himself/herself owning the wireless communication apparatus entering into the contact for the connection right. However, generally, in most cases, the connection right that is granted to each wireless communication apparatus is limited to a purpose of connecting to the network 40 for purchasing content from a service site that is operated by the service provider 50, or is limited in connection speed. That is, the connection right is a connection right that the service provider 50 grants free of charge, and thus, in most cases, a limit is imposed on the connection right for a balance between a burden of a line charge for the connection right and a benefit resulting from a service operation.

At this point, for example, it is assumed that the content that is provided is the electronic book. For example, if the electronic book is text-based, an amount of the electronic book is comparatively small because efficient compression is possible. For this reason, it is assumed that even though the limit is imposed on the connection speed, it does not take much time to download the electronic book. However, in recent years, for example, there has been a growing importance of an electronic book, such as a comic or a cartoon, that is a picture-based, not text-based. There is a tendency in such content for a decreasing compression rate and an increasing amount of content. For this reason, if the limit is imposed on the connection speed, there is concern that it will take much time to download the content and convenience for the user will be decreased.

Accordingly, it may be considered that the limit to the connection speed be alleviated and thus the convenience relating to the download time being increased. However, it is also assumed that alleviation of the limit to the connection speed in this manner increases the service operation side's burden of the line charge and thus content charge is difficult to add, or the service is difficult to operate. It is also assumed that the alleviation of the limit to connection speed increases the user's burden in this manner.

Accordingly, according to the first embodiment, the service provider 50 prepares in advance the type-different connection rights (contract authentication information) and properly uses the type-different connection rights (contract authentication information) according to a condition for use, and thus the user is enabled to be properly provided with the various services from the information processing apparatus 200.

[Configuration Example of the Communication System]

FIG. 2 is a block diagram illustrating a system configuration example of a communication system 100 according to the first embodiment of the present technology.

The communication system 100 includes a network 110, base stations 122 and 301, a communication control apparatus (second communications carrier) 120, a communication control apparatus (first communications carrier) 300, the information processing apparatus 200, and wireless communication apparatuses 130, 140, and 400.

Moreover, each of the wireless communication apparatuses 130, 140, and 400 is assumed to retain the valid contract authentication information provided by the communication control apparatus (first telecommunications carrier) 300. That is, the connection right to connect to the communication control apparatus (first telecommunications carrier) 300 is set to be in each of the wireless communication apparatuses 130, 140, and 400. Each of these connection rights is assumed to be provided by the service provision side or to be in accordance with the contract that the user of each wireless communication apparatus enters into. Furthermore, these are also assumed to be combined with one another.

At this point, the communication system 100 is a system that corresponds to the communication system 10 illustrated in FIG. 1. Specifically, the communication control apparatus (second communications carrier) 120 corresponds to the communication control apparatus 20 illustrated in FIG. 1, the communication control apparatus (first telecommunications carrier) 300 corresponds to the communication control apparatus 30 illustrated in FIG. 1, and the information processing apparatus 200 corresponds to the information processing apparatus 200 illustrated in FIG. 1. For this reason, in this example, a part of the description of what is common to the communication system 100 and the communication system 10 illustrated in FIG. 1 is omitted.

The network 110 is a network such as the telephone network, or the Internet (for example, the public line network). Furthermore, the network 110 and the communication control apparatus (second communications carrier) 120 are connected to each other through the gateway (not illustrated). In the same manner, the network 110 and the communication control apparatus (first telecommunications carrier) 300 are connected to each other though the gateway (not illustrated).

The communication control apparatus (second communications carrier) 120 is a communication control apparatus that is managed by the wireless communications carrier that provides the service such as the initial connection registration and the wireless connection service, and corresponds to the communication control apparatus 20 illustrated in FIG. 1. That is, the communication control apparatus (second communications carrier) 120 provides the Internet-based service and the like, and for example, corresponds to the wireless communications carrier (for example, the mobile phone carrier) that provides the wireless connection service.

Furthermore, the communication control apparatus (second communications carrier) 120 includes the control unit 121.

The control unit 121 performs authentication control on the wireless communication apparatus that is connected through the base station 122. For example, the control unit 121 authenticates the wireless communication apparatus that retains the valid contract authentication information provided by the communication control apparatus (second communications carrier) 120, among the wireless communication apparatuses that are connected through the base station 122. Then, the communication control apparatus (second communications carrier) 120 connects the authenticated wireless communication apparatus to the network 110 through the gateway (not illustrated).

Furthermore, the control unit 121 performs the authentication based on the PCID on the wireless communication apparatus that is connected through the base station 122. Then, the control unit 121 provides the authenticated wireless communication apparatus with the services such as the initial connection registration. Furthermore, the control unit 121 is connected to the communication control apparatus (first telecommunications carrier) 300, and exchanges various pieces of information between the communication control apparatus 120 and the communication control apparatus (first telecommunications carrier) 300.

The base station 122 is a mobile communication base station (NodeB) that connects the wireless communication apparatus 400 and the communication control apparatus (second communications carrier) 120 through the wireless line.

The communication control apparatus (first communications carrier) 300 is a communication control apparatus that is managed by the wireless communications carrier that provides the services such as the initial connection registration and the wireless connection service, and corresponds to the communication control apparatus 30 illustrated in FIG. 1. That is, the communication control apparatus (first communications carrier) 300 provides the Internet-based service and the like, and for example, corresponds to the wireless communications carrier (for example, the mobile phone carrier) that provides the wireless connection service. Furthermore, the communication control apparatus (first telecommunications carrier) 300 includes a control unit 320 (illustrated in FIG. 6).

The control unit 320 performs authentication control on the wireless communication apparatus that is connected through a base station 301. For example, the control unit 320 authenticates the wireless communication apparatus that retains the valid contract authentication information provided by the communication control apparatus (first communications carrier) 300, among the wireless communication apparatuses that are connected through the base station 301. Then, the communication control apparatus (first communications carrier) 300 connects the authenticated wireless communication apparatus to the network 110 through the gateway (not illustrated).

Furthermore, the control unit 320 performs the authentication based on the PCID on the wireless communication apparatus that is connected through the base station 301. Then, the control unit 320 provides the authenticated wireless communication apparatus with the services such as the initial connection registration. Furthermore, the control unit 320 is connected to the communication control apparatus (second telecommunications carrier) 120, and exchanges various pieces of information between the communication control apparatus 300 and the communication control apparatus (second telecommunications carrier) 120.

At this point, an example in which the valid contract authentication information (revisable connection right) of the communication control apparatus (first telecommunications carrier) 300 is set in the communication system 100 (example in which the connection right is set) is described. For example, the contract authentication information is set to be in each of the wireless communication apparatuses. Then, the control unit 320 (illustrated in FIG. 6) performs the validation/invalidation of the contract authentication information that is retained in each wireless communication apparatus, and thus can set the revisable connection right. Moreover, the validation/invalidation of the contract authentication information that is retained in each wireless communication apparatus can be performed based on the control at the communication control apparatus (second communications carrier) 120 side. For this reason, the control unit 121 may set the revisable connection right by validating/invalidating the contract authentication information that is retained in each wireless communication apparatus.

Furthermore, instead of retaining the contract authentication information in each wireless communication apparatus, the revisable connection right may be set by transmitting the contract authentication information itself. For example, setting information (including the contract authentication information) is transmitted from the communication control apparatus (first telecommunications carrier) 300 to the wireless communication apparatus. The contract authentication information included in the setting information is retained in the wireless communication apparatus, and thus the valid contract authentication information is set to be in the wireless communication apparatus. Moreover, the transmission of the setting information (including the contract authentication information) to each wireless communication apparatus can be performed at the communication control apparatus (second communications carrier) 120 side. For this reason, the control unit 121 may set the revisable connection right by transmitting the setting information (including the contract authentication information) to each wireless communication apparatus.

The information processing apparatus 200 is an information processing apparatus (for example, a content server) that provides the various services over the network 110, and provides each wireless communication apparatus with the various communication services using the wireless communication. Moreover, the information processing apparatus 200 is described in detail referring to FIG. 3.

In this manner, the communication system 100 is a wireless communication system that has the wireless communication apparatus (device), in which the contract authentication information is revisable over the network.

[Configuration Example of the Information Processing Apparatus]

Figure 3:
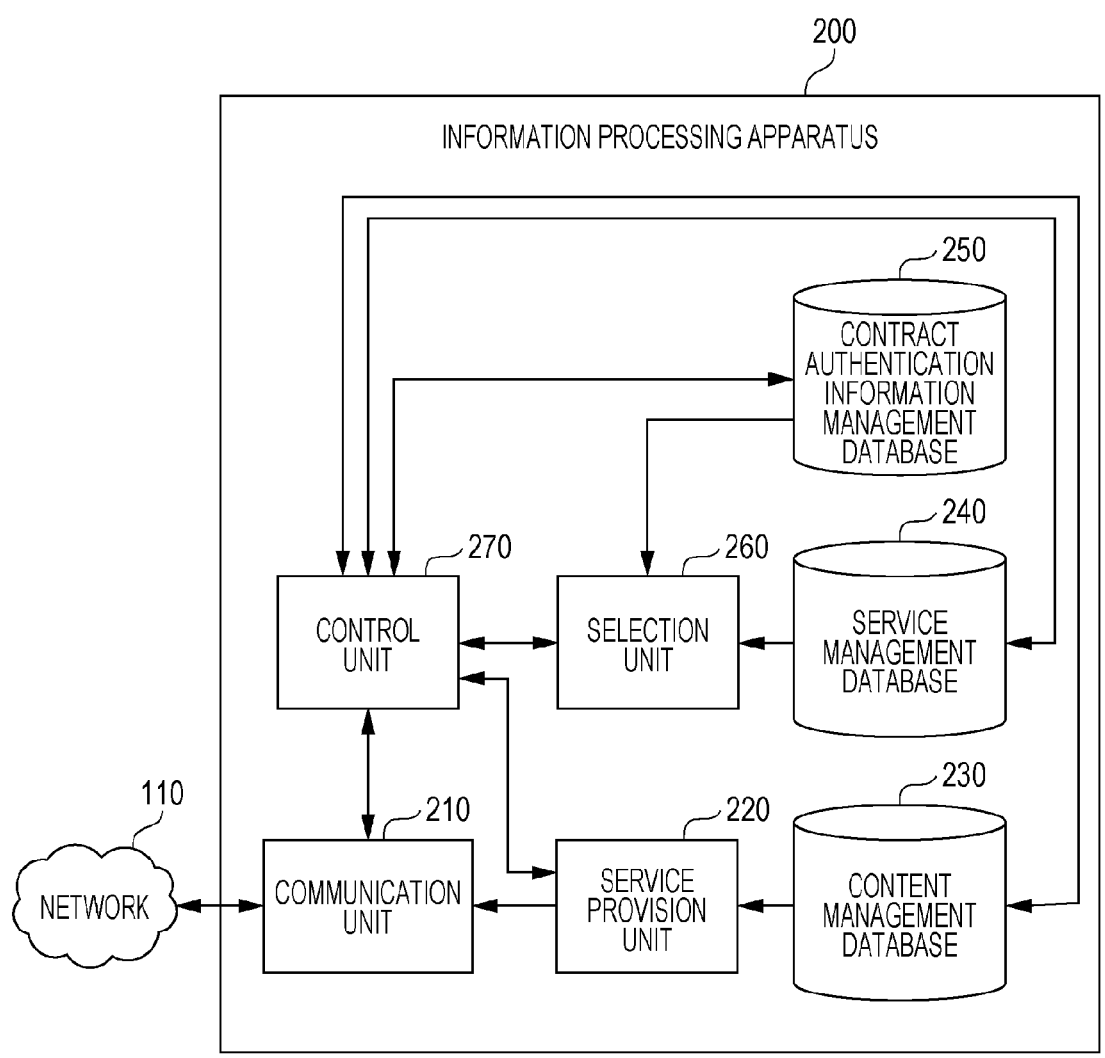
FIG. 3 is a block diagram illustrating a functional configuration example of an information processing apparatus 200 according to the first embodiment of the present technology.

FIG. 3 is a block diagram illustrating a functional configuration example of the information processing apparatus 200 according to the first embodiment of the present technology.

The information processing apparatus 200 includes a communication unit 210, a service provision unit 220, a content management database 230, a service management database 240, a contract authentication information management database 250, a selection unit 260, and a control unit 270.

The communication unit 210 is connected to the network 110, and performs the communication between each wireless communication apparatus that is connected through the network 110, under the control of the control unit 270. For example, the communication unit 210 receives, over the network 110, each piece of information (for example, various types of notification) that is transmitted from each wireless communication apparatus, and outputs each piece of information received to the control unit 270. Furthermore, the communication unit 210 transmits various items of content being output from the service provision unit 220, to each wireless communication apparatus over the network 110.

Under the control of the control unit 270, in response to a request from the wireless communication apparatus that is connected through the network 110, the service provision unit 220 provides the wireless communication apparatus with the various services. Furthermore, when providing the various communication services, the service provision unit 220 uses various pieces of data that are stored in the content management database 230. For example, if a request for the download of the content from the wireless communication apparatus 400 is received, the service provision unit 220 obtains content (for example, electronic book content) relating to the request from the content management database 230. Then, the service provision unit 220 transmits the obtained content to the wireless communication apparatus 400 through the communication unit 210.

The content management database 230 is a database in which to store various pieces of data that are used when the service provision unit 220 provides the various communication services, or pieces of data that are transmitted from the wireless communication apparatus. For example, content (for example, image content) that is uploaded from the wireless communication apparatus, content for providing upload-target content (for example, the electronic book content or a website), or the like are stored in the content management database 230.

The service management database 240 is a database in which to store various pieces of data that are used when the information processing apparatus 200 provides the various communication services. Moreover, the service management database 240 is described in detail referring to FIG. 4.

The contract authentication information management database 250 is a database in which to store various pieces of information for managing the contract authentication information (multiple types of pieces of contract authentication information that are different in the condition for use) that is set to be in each wireless communication apparatus (device) that is connected through the base station 301. At this point, the multiple types of pieces of contract authentication that are different in the condition for use are multiple pieces of contract authentication information that are different in the connection speed (max rate), or multiple pieces of contract authentication information that are different in control of QOS (priority(priority connection right)). Moreover, the contract authentication information management database 250 is described in detail referring to FIG. 5.

The selection unit 260 selects the contract authentication information that is used when performing communication processing between the information processing apparatus 200 and the wireless communication apparatus 400, and outputs a result of the selection to the control unit 270. For example, based on the request from the wireless communication apparatus 400, the selection unit 260 selects the contract authentication information that has to be set to be in the wireless communication apparatus 400, from the multiple types of pieces of contract authentication information that are managed by the contract authentication information management database 250. For example, if the request is received from the wireless communication apparatus 400, based on predetermined information relating to the wireless communication apparatus 400, the selection unit 260 selects the contract authentication information that has to be set to be in the wireless communication apparatus 400.

At this point, the predetermined information is history information on past purchases by the user of the wireless communication apparatus (for example, the information on the past purchases in usage information 244 illustrated in FIG. 4). Furthermore, the predetermined information may be information (for example, the number of times that the wireless communication apparatus has been used for the past one year, in the usage information 244 illustrated in FIG. 4) relating to a usage state of the wireless communication apparatus. Furthermore, the predetermined information may be information (for example, contract information in the usage information 244 illustrated in FIG. 4) relating to a contract state of the wireless communication apparatus. Furthermore, the predetermined information may be information (for example, points in the usage information 244 illustrated in FIG. 4) relating to points owned by the user of the wireless communication apparatus. Furthermore, the predetermined information, for example, may be information (for example, 100 kbps) relating to a maximum connection speed available for the connection right, which is pre-set to be in the wireless communication apparatus. At this point, because the contract authentication information corresponds to the connection right, according to the embodiment of the present technology, the selection of the contract authentication information is assumed to mean the selection of the connection right. In the same manner, the selection of the connection right is assumed to mean the selection of the contract authentication information. Furthermore, this is also true for the setting of the contract authentication information, the setting of the connection right and the like.

The control unit 270 performs control relating to the communication that is performed between each wireless communication apparatus that is connected through the network 110. For example, the control unit 270 performs control for performing content provision processing, upload processing, or download processing (communication processing). Moreover, the content provision processing is the communication processing that provides content from the information processing apparatus 200 to the wireless communication apparatus 400 (for example, browsing of the website). Furthermore, the upload processing is the communication processing that uploads content from the wireless communication apparatus 400 to the information processing apparatus 200, and the download processing is the communication processing that downloads content from the information processing apparatus 200 to the wireless communication apparatus 400.

Furthermore, for example, after setting the connection right (contract authentication information) selected by the selection unit 260 to be in the wireless communication apparatus 400, the control unit 270 controls a wireless communication service between the information processing apparatus 200 and the wireless communication apparatus 400. For example, the wireless communication service relating to the download of music content or image content is controlled.

[Configuration Example of the Service Management Database]

FIG. 4 is a diagram schematically illustrating the service management database 240 according to the first embodiment of the present technology.

A user ID 241, a password 242, a terminal identification information 243, and the usage information 244 are individually matched and stored in the service management database 240. These pieces of information, for example, are updated sequentially by the control unit 270, based on a request for a registration amendment from the service provider 50. For example, if the user of the wireless communication apparatus 400 enters into a contract to receive a predetermined service with the service provider 50, contents of the contract are reflected in and registered with the service management database 240.

An ID that is used when the user of the wireless communication apparatus is provided with the service (service that is received using the wireless communication apparatus) in accordance with the contract between the user and the service provider 50 is stored in the user ID 241.

A password that is used when the user of the wireless communication apparatus is provided with the service (service that is received using the wireless communication apparatus) in accordance with the contract between the user and the service provider 50 is stored in the password 242.

The terminal identification information for identifying each wireless communication apparatus is stored in the terminal identification information 243. The terminal identification information is identification information (for example, a unique ID allocated to each device) for identifying the wireless communication apparatus. For example, an international mobile equipment identity (IMEI) is stored in the terminal identification information 243. Moreover, the IMEI is expressed using a 15-digit number, but for ease of description, the IMEI is expressed as "AAAA", "BBBB", and so forth in FIG. 4 and the like. For example, "CCCC" in the terminal identification information 243 is assumed to correspond to the wireless communication apparatus 400.

The information (usage information) relating to the use of the service (service that is received using the wireless communication apparatus) in accordance with the contract between the user of the wireless communication apparatus and the service provider 50 is stored in the usage information 244. For example, the date and time of use, the number of times that the service has been used for the past one year, the history information on the past purchases, the points, the contract information and the like are stored as the usage information. For example, the date and time of use for the past one year is stored as the date and time of use. Furthermore, for example, a commodity purchased from the service provider 50, a purchase amount, the date and time of purchase, and the like are stored as the history information on the past purchases. Furthermore, points given to the user are stored as the points. For example, the points are given depending on the number of times that the service is used, the purchase amount, or the like. Furthermore, the contract information is information relating to contents of the contract (for example, the contract to allocate the connection right that has a high maximum connection speed at the time of the download) between the user of the wireless communication apparatus and the service provider 50.

[Configuration Example of the Contract Authentication Information Management Database]

FIG. 5 is a diagram schematically illustrating the contract authentication information management database 250 according to the first embodiment of the present technology. Moreover, a transitional example is illustrated in FIGS. 5a and 5b in a case where the contract authentication information in a contract authentication information management number 251 "4" is allocated temporarily.

A maximum connection speed 252, a priority connection right 253, a usage state 254, and an allocation destination 255 are stored in the contract authentication information management database 250 in a manner of matching to a contract authentication information management number 251. That is, each piece of information is managed for every piece of contract authentication information that can be allocated by the service provider 50.

The contract authentication information management number 251 is a management number of the contract authentication information that can be allocated by the service provider 50.

The maximum connection speed 252 is a maximum connection speed that can be used when performing the communication using the contract authentication information that is allocated by the service provider 50.

The priority connection right 253 is information that indicates whether or not the priority connection right (right with which the connection is possible) is assigned to the contract authentication information that is preferentially allocated by the service provider 50. In FIG. 5, for example, "O" is assigned to the contract authentication information to which the priority connection right is assigned and "X" is assigned to the contract authentication information to which the priority connection right is not assigned.

The usage status of the contract authentication information is recorded in the usage state 254. In FIG. 5, for example, "in use" is assigned to the contract authentication information that is allocated to the wireless communication apparatus, and "-" is assigned to the contract authentication information that is not allocated to the wireless communication apparatus.

The wireless communication apparatus to which the contract authentication information is allocated is recorded in the allocation destination 255. For example, the terminal identification information (for example, the terminal identification information 243 illustrated in FIG. 4) on the wireless communication apparatus is recorded in the allocation destination 255. Moreover, other pieces of information (for example, the user ID) by which to specify the wireless communication apparatus to which the contract authentication information is allocated may be recorded in the allocation destination 255.

In this manner, multiple pieces of contract authentication information that are different in the condition for use (for example, the maximum connection speed and the priority connection right) are managed by the contract authentication information management database 250. That is, multiple connection rights that are different in the condition for use are managed by the contract authentication information management database 250.

[Configuration Example of the Communication Control Apparatus]

Figure 6:
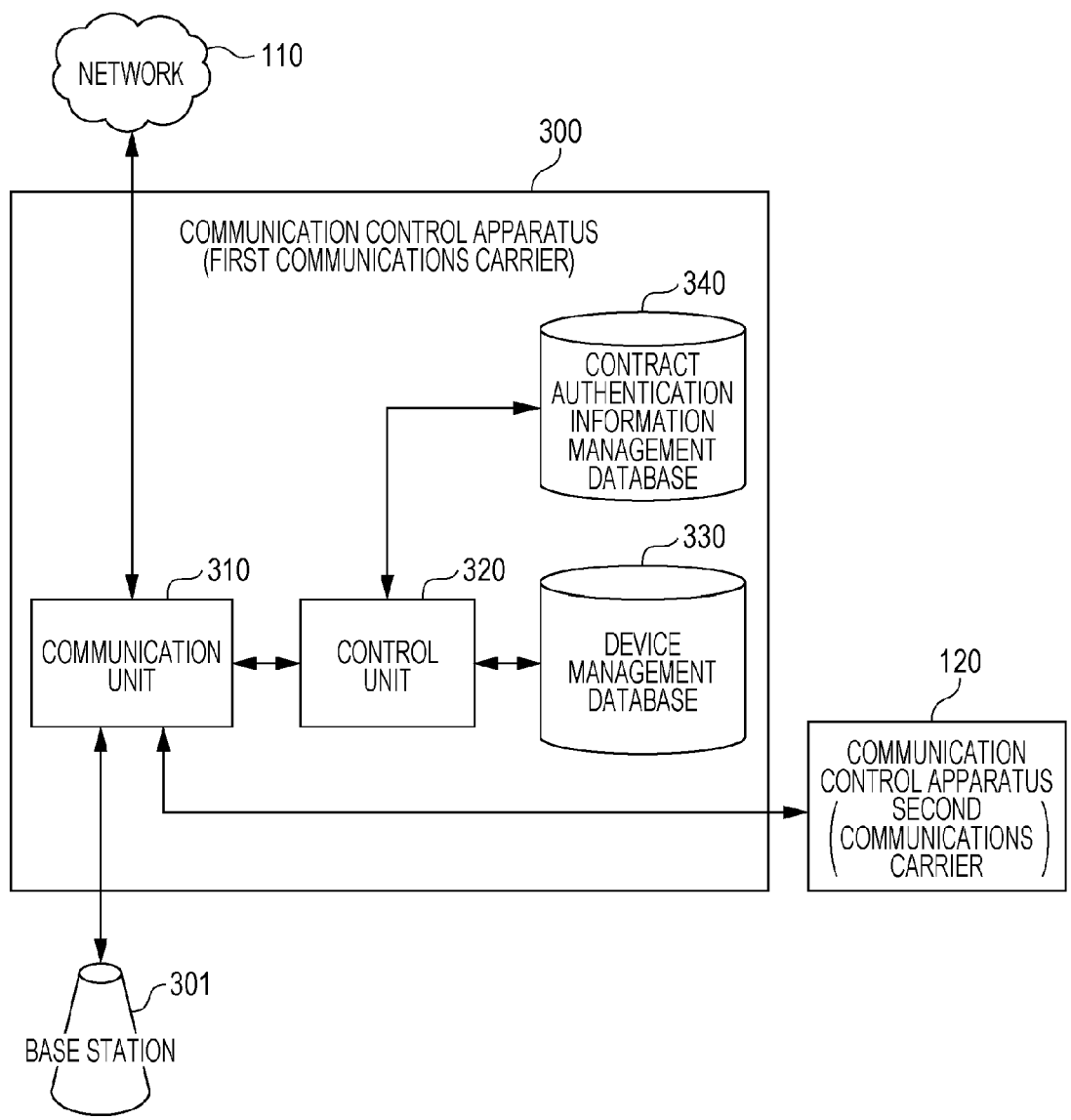
FIG. 6 is a block diagram illustrating a functional configuration example of a communication control apparatus (first telecommunications carrier) 300 according to the first embodiment of the present technology.

FIG. 6 is a block diagram illustrating a functional configuration example of a communication control apparatus (first telecommunications carrier) 300 according to the first embodiment of the present technology.

The communication control apparatus (first telecommunications carrier) 300 includes a communication unit 310, a control unit 320, a device management database 330, and a contract authentication information management database 340.

The communication unit 310 is connected to the network 110, the communication control apparatus (second communications carrier) 120, and the base station 301, and performs the communication between each wireless communication apparatus that is connected through the base station 301, under the control of the control unit 320.

The control unit 320 performs various types of control relating to the wireless communication apparatus that is connected directly or through the communication control apparatus (second communications carrier) 120.

The device management database 330 is a database in which to store various pieces of information for managing each wireless communication apparatus (device) that is connected through the base station 301. Moreover, the device management database 330 is described in detail referring to FIG. 7.

The contract authentication information management database 340 is a database in which to store various pieces of information for managing the contract authentication information that is set to be in each wireless communication apparatus (device) that is connected through the base station 301. Moreover, the contract authentication information management database 340 is described in detail referring to FIG. 8.

[Configuration Example of the Device Management Database]

FIG. 7 is a diagram schematically illustrating the device management database 330 according to the first embodiment of the present technology.

Service identification information 331, terminal identification information 332, and contract authentication information allocation information 333 are individually matched and stored in the device management database 330. These pieces of information, for example, are updated sequentially by the control unit 320, based on a request from each wireless communication apparatus. Furthermore, a transitional example of the update is illustrated in FIGS. 7a and 7b. That is, FIG. 7a illustrates a state where the contract authentication information is allocated to two wireless communication apparatuses, and FIG. 7b illustrates a state where the contract authentication information is allocated to three wireless communication apparatuses (including the wireless communication apparatus 400).

The identification information for each service is stored in the service identification information 331. For example, a service (for example, a download service) that is provided by the service provider 50 is expressed as "G0001".

The terminal identification information for identifying each wireless communication apparatus is stored in the terminal identification information 332. Moreover, the terminal identification information 332 corresponds to the terminal identification information 243 illustrated in FIG. 4.

Information (contract authentication information allocation information) for managing whether or not the contract authentication information is allocated to the wireless communication apparatus is stored in the contract authentication information allocation information 333. For example, if the contract authentication information is allocated to the wireless communication apparatus, the management information (for example, the contract authentication information management number 251 illustrated in FIG. 5) on such a service is stored.

[Configuration Example of the Contract Authentication Information Management Database]

FIG. 8 is a diagram schematically illustrating the contract authentication information management database 340 according to the first embodiment of the present technology.

Contract authentication information identification information 341 and terminal identification information 342 are individually matched and stored in the contract authentication information management database 340. These pieces of information, for example, are updated sequentially by the control unit 320, based on a request from each wireless communication apparatus. Furthermore, a transitional example of the update is illustrated in FIGS. 8a and 8b.

As described above, it is assumed that the service provider 50 enters into a contract with the first telecommunications carrier in advance and prepares a given number of the pieces of contract authentication information (for example, a contract authentication information pool) based on the contract. For this reason, when the user of the wireless communication apparatus uses a service that is provided by the service provider 50, the contract authentication information that is not in use, among the given number of the pieces of contract authentication information, is temporarily allocated. In this manner, the given number of the pieces of contract authentication information (that is, the contract authentication information pool) that is allocated to each wireless communication apparatus is managed by the contract authentication information management database 340.

The contract authentication information identification information for identifying the contract authentication information that is allocated to each wireless communication apparatus is stored in the contract authentication information identification information 341.

The terminal identification information for identifying each wireless communication apparatus is stored in the terminal identification information 342. Moreover, the terminal identification information 342 corresponds to the terminal identification information 243 illustrated in FIG. 4.

[Configuration Example of the Wireless Communication Apparatus]

FIG. 9 is a block diagram illustrating an internal configuration example of a wireless communication apparatus 400 according to the first embodiment of the present technology.

The wireless communication apparatus 400 includes an antenna 411, an antenna sharing unit 412, a modulation unit 421, a demodulation unit 422, a control unit 430, a memory 440, and a contract authentication information storage unit 450. Furthermore, the wireless communication apparatus 400 includes an operation unit 460, a display unit 470, a positional information obtainment unit 480, a microphone 491, and a speaker 492. Furthermore, these units are connected to one another by a bus 431.

For example, if reception processing is performed, an electromagnetic wave that is received by the antenna 411 passes through the antenna sharing unit 412, and is demodulated by the demodulation unit 422, and the demodulated reception data is supplied to the control unit 430. If the reception processing is call reception processing, the demodulated reception data (voice data) passes through the control unit 430 and is output, as a voice, from the speaker 492.

Furthermore, for example, if transmission processing is performed, transmission data that is output by the control unit 430 is modulated by the modulation unit 421, and the modulated transmission data passes through the antenna sharing unit 412 and is transmitted from the antenna 411. If the transmission processing is call processing, the voice data that is input from the microphone 491 passes through the control unit 430 and is modulated by the modulation unit 421, and the modulated transmission data (voice data) passes through the antenna sharing unit 412 and is transmitted from the antenna 411.

The control unit 430 performs various types of control, based on a control program that is stored in the memory 440. The control unit 430, for example, is configured from the microprocessor. For example, the control unit 430 is connected to the modulation unit 421 and the demodulation unit 422, and performs transmission and reception of various pieces of data that is performed between the wireless communication apparatus 400 and the communication control apparatus (second communications carrier) 120 that is connected through the base station 122. Furthermore, the control unit 430, for example, performs connection processing that connects the communication control apparatus (first telecommunications carrier) 300 and the communication control apparatus (second communications carrier) 120 through the wireless line using a restricted connection based on the PCID without using the contract authentication information.

Furthermore, for example, the control unit 430 requests the information processing apparatus 200 to provide a predetermined wireless communication service (for example, the download of content). Furthermore, the control unit 430 sets the connection right that is selected from the multiple types of connection rights by the information processing apparatus 200 based on the request, and performs control for performing the wireless communication service that is performed between the wireless communication apparatus 400 and the information processing apparatus 200. Moreover, the control unit 430 is one example of each of a transmission control unit and a control unit that are included in the wireless communication apparatus recited in the claims.

The memory 440 is a memory in which to store a control program necessary for the control unit 430 to perform various types of control, the transmission data, the reception data, and the like. The memory 440 is configured, for example, from a read only memory (ROM) or a random access memory (RAM). Furthermore, the terminal identification information (for example, the IMEI) for specifying the wireless communication apparatus 400 is stored in the memory 440.

The contract authentication information storage unit 450 is a memory that retains the contract authentication information. As the contract authentication information storage unit 450, for example, a universal integrated circuit card (UICC) may be used, and a dedicated memory for keeping the contract authentication information secure may be used. Moreover, if the UICC card is used as the contract authentication information storage unit 450, the UICC in which the validation and the invalidation of the contract authentication information are possible is used, not the UICC in which the contract authentication information is written fixedly. That is, the UICC is used on which validation processing and invalidation processing of the contract authentication information can be performed by the control unit 430, based on the information (setting information and invalidation information) that is received from the antenna 411 and is demodulated. Furthermore, the UICC is used on which revision processing of the contract authentication information can be performed. Moreover, for the validation processing and the invalidation processing of the contract authentication information, the validation processing and the invalidation processing that are stipulated in the Third Generation Partnership Project (3GPP) can be performed. Furthermore, the contract authentication information storage unit 450 may be provided within the memory 440 by securing a secure region in the memory 440.

The operation unit 460 is an operation application unit to which an operation input by the user is applied, and a signal according to the applied operation input is output to the control unit 430. The operation unit 460 includes various keys, such as numeric keys and alphabetical keys. Furthermore, operations for performing the various communication services between the wireless communication apparatus 400 and the information processing apparatus 200 are applied to the operation unit 460.

The display unit 470 is a display unit on which various pieces of information (text information or temporal information or the like) are displayed under the control of the control unit 430. For example, each piece of information (for example, display screens illustrated in FIGS. 11 to 14) for performing the various communication services between the wireless communication apparatus 400 and the information processing apparatus 200 are displayed on the display unit 470. Moreover, for example, a display panel, such as an organic electro luminescence (EL) panel, or a liquid crystal display (LCD) panel, can be used as the display unit 470. Moreover, the operation unit 460 and the display unit 470 can be integrally formed as a touch panel on which the operation input can be performed by a user's finger coming into contact with a display surface of the touch panel or by the user's finger coming in close proximity to the display surface.

The positional information obtainment unit 480 obtains positional information indicating a position in which the wireless communication apparatus 400 is present, and outputs the obtained positional information to the control unit 430. The positional information obtainment unit 480, for example, is realized as a GPS unit that calculates the positional information, based on a global positioning system (GPS) signal which is received by a GPS signal reception antenna (not illustrated). Each data item relating to latitude, longitude, altitude, and the like at the time of receiving the GPS signal is included in the calculated positional information. Furthermore, a positional information obtainment apparatus may be used that obtains the positional information using another method of obtaining the positional information. For example, the positional information obtainment apparatus may be used that elicits positional information using access point information that results from a local area network (LAN) that is present in the vicinity and that obtains the positional information and that obtains the positional information.

[Example of Use of the Wireless Communication Apparatus]

FIG. 10 is a diagram illustrating a simplified usage example of use of the wireless communication apparatus 400 according to the first embodiment of the present technology. FIG. 10 illustrates a state where music content is downloaded using the wireless communication apparatus 400.

In FIG. 10, it is assumed that the wireless communication apparatus 400 is a voice output apparatus (for example, a portable music player) which has the wireless communication function and can use the software downloadable SIM. Furthermore, it is assumed that the information processing apparatus 200 is a content server that can retain various items of content (music content and image content).

At this point, an example is described in which the music content to be output as audio is downloaded from the information processing apparatus 200 using the wireless communication apparatus 400 and thus is retained in the wireless communication apparatus 400. For example, it is assumed that with the operation unit 460 of the wireless communication apparatus 400, a user 60 performs each operation for downloading desired music content (for example, Curry Weather 70) from the information processing apparatus 200. A display example of such an operation screen is described in detail referring to FIGS. 11 to 14.

In this manner, if a predetermined operation is performed, the wireless communication apparatus 400 can download the desired music content (for example, Curry Weather 70) from the information processing apparatus 200 using the contract authentication information. For example, the music content (for example, Curry Weather 70) that is recorded in the content management database 230 (illustrated in FIG. 3) is downloaded to the wireless communication apparatus 400 through the communication control apparatus (first telecommunications carrier) 300 over the network 110 and is recorded in the memory 440.

At this point, for example, it is assumed that an amount of contents of the desired music content (Curry Weather 70) is large. For this reason, as described above, if the limit is imposed on the connection speed, there is concern that it will take much time to download the music content (Curry Weather 70) and convenience for the user will be decreased.

Then, according to the first embodiment of the present technology, when using a specific service provided by the service provider 50, the proper contract authentication information suitable for the service is temporarily set and thus the user is properly provided with various services from the information processing apparatus 200.

[Example of the Display Screen at a Time of Obtaining the Content]

FIGS. 11 to 14 are diagrams, each illustrating an example of the display screen that is displayed on the display unit 470 of the wireless communication apparatus 400 according to the first embodiment of the present technology. Each of these display screens, for example, is displayed based on each piece of information that is transmitted from the information processing apparatus 200.

Figure 11:
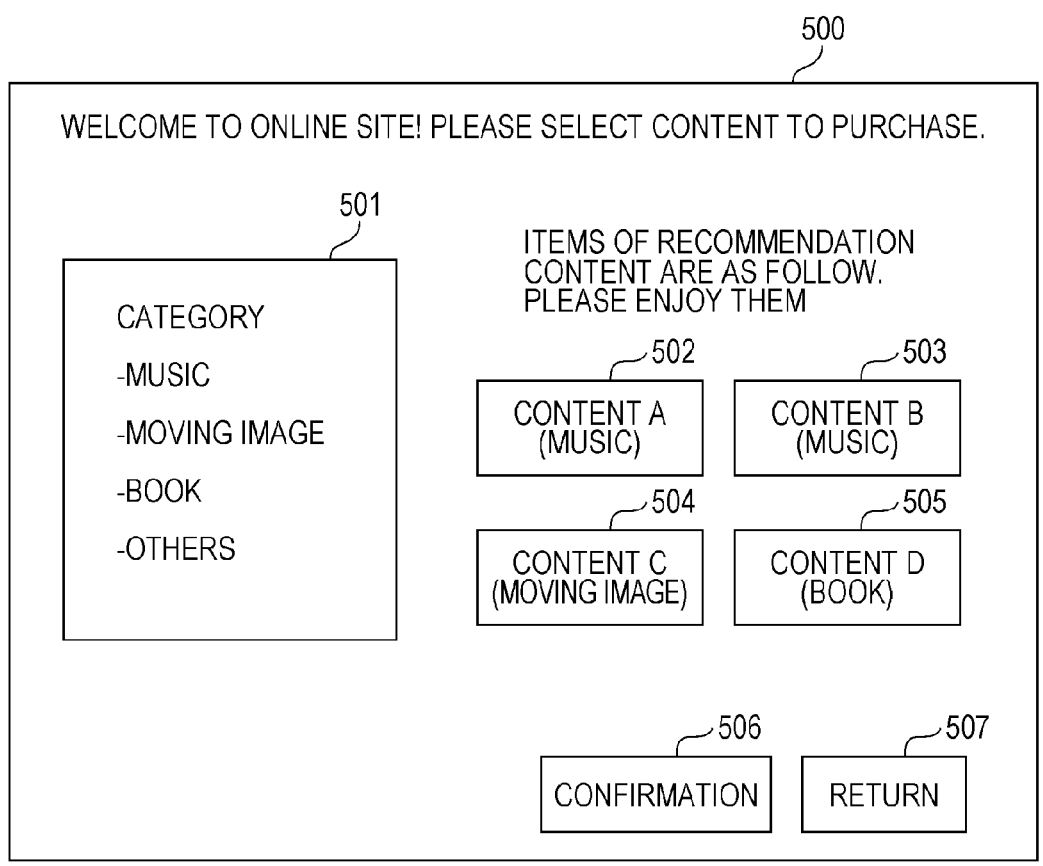
FIG. 11 is a diagram illustrating an example of a display screen that is displayed on a display unit 470 of the wireless communication apparatus 400 according to the first embodiment of the present technology.

FIG. 11 illustrates an example of a display screen (display screen 500) that is first displayed after the user connects to the service site that is provided by the information processing apparatus 200 in order to obtain a desired content.

A classification menu region 501, content selection buttons 502 to 505, a confirmation button 506, and a return button 507 are provided on the display screen 500.

The classification menu region 501 is a region for selecting a category (for example, music, moving image, book, and others) of the content that is desired by the user. For example, in the classification menu region 501, a selection operation can be performed by a pushing-down operation on a portion of the category (for example, music) of the content that is desired by the user.

The content selection buttons 502 to 505 are regions for selecting the content (for example, items of content A to D) that is desired by the user. Moreover, in the display screen 500 that is first displayed after the connection to the service site, regardless of the category of the content, the content selection buttons 502 to 505 for suggesting content (recommendation content) are displayed. Furthermore, for example, if the content that the user wants to purchase is present on one button among the content selection buttons 502 to 505, the selection operation on the content can be performed by the pushing-down operation of a portion of the one button. An example of the display after the selection operation is illustrated in FIG. 13. Furthermore, if the content that is desired by the user is not present on one button among the content selection buttons 502 to 505, the content selection button for the desired content can be displayed by the selection operation of the category in the classification menu region 501. An example of the display is illustrated in FIG. 12.

The confirmation button 506 is a button that, after performing each of the operations (input operations) described above, is pushed down to confirm contents of the operation.

The return button 507, for example, is a button that is pushed down to return to the display screen that has been displayed just previously.

Figure 12:
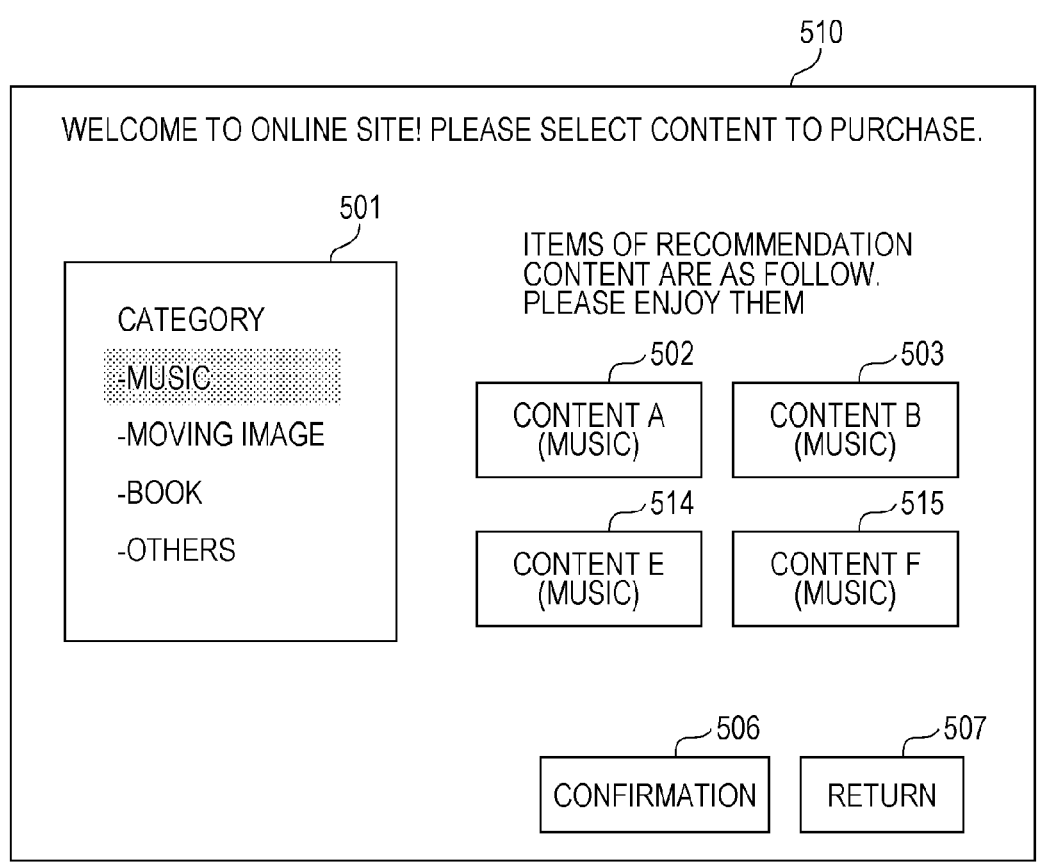
FIG. 12 is a diagram illustrating an example of the display screen that is displayed on the display unit 470 of the wireless communication apparatus 400 according to the first embodiment of the present technology.
Figure 13:
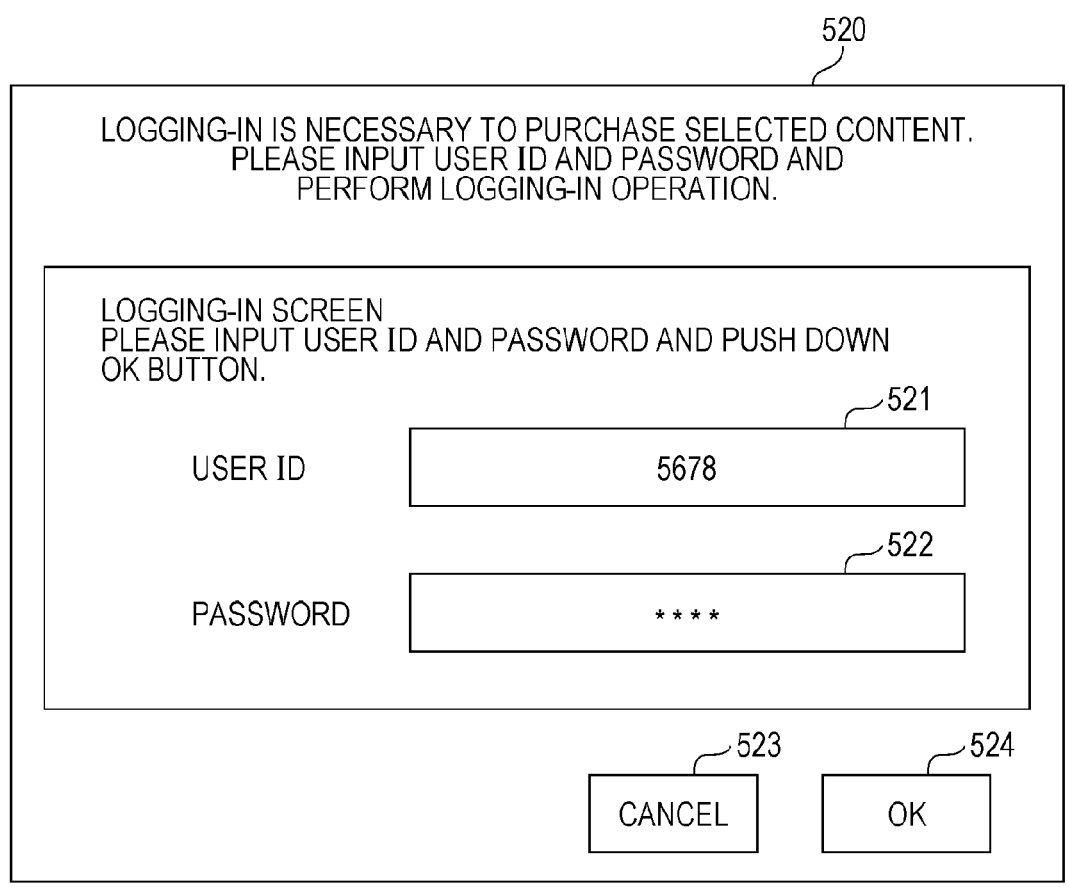
FIG. 13 is a diagram illustrating an example of the display screen that is displayed on the display unit 470 of the wireless communication apparatus 400 according to the first embodiment of the present technology.

FIG. 12 illustrates an example of a display screen (display screen 510) that is displayed after the selection operation is performed on "music" in the classification menu region 501 illustrated in FIG. 11. Moreover, a display aspect of a "music" portion of the classification menu region 501 is changed in the display screen 500 illustrated in FIG. 11, and instead of the content selection buttons 504 and 505, the content selection buttons 514 and 515 for the music content are displayed on the display screen 510. That is, only the content selection buttons 502, 502, 514, and 515 relating to the content to which the category selected in the classification menu region 501 belongs are display targets. Furthermore, if the number of the content selection buttons, the display targets, is large, the content selection buttons can be suitably displayed by a scroll operation and the like.

At this point, it is assumed that among the items of content that are displayed on the display screen 510, purchase of the content corresponding to the content selection button 514 is desired. In this case, the user performs the selection operation on the content selection button 514 (that is, the pushing-down operation on content E (music), and the pushing-down operation on the confirmation button 506). An example of the display after the selection operation is illustrated in FIG. 13.

FIG. 13 illustrates an example of a display screen (logging-in screen 520) that is displayed after the selection operation on the content selection button 514 is performed on the display screen 510 illustrated in FIG. 12. The logging-in screen 520 is a display screen for transitioning to a content purchase screen 530 illustrated in FIG. 14.

A user ID input region 521, a password input region 522, a cancel button 523, and an OK button 524 are provided on the logging-in screen 520.

The user ID input region 521 is a region for inputting the user ID for using the service (service that is received using the wireless communication apparatus 400) in accordance with the contract between the user of the wireless communication apparatus 400 and the service provider 50. The user ID is the same as the user ID 241 illustrated in FIG. 4.

The password input region 522 is a region for inputting the password for using the service (service that is received using the wireless communication apparatus 400) in accordance with the contract between the user of the wireless communication apparatus 400 and the service provider 50. That is, the user ID for the service in accordance with the contract between the user of the wireless communication apparatus 400 and the service provider 50 is input into the user ID input region 521, and the password for the service is input into the password input region 522. Specifically, the information that is stored in the user ID 241 illustrated in FIG. 4 is input into the user ID input region 521, and the information that is stored in the password 242 illustrated in FIG. 4 is input into the password input region 522. Moreover, the password is expressed as "****" in FIG. 13 because the password is not displayed on the actual screen from the perspective of security.

In this manner, when each piece of information is input into the user ID input region 521 and the password input region 522 and the OK button 524 is pushed down, transitioning to a content purchase screen for purchasing a desired content takes place. An example of the display is illustrated in FIG. 14.

Furthermore, when the OK button 524 is pushed down after inputting each of the pieces of information, the control unit 430 transmits to the information processing apparatus 200 the terminal identification information and the maximum connection speed that is available with the current connection right, along with each piece of information being input. Based on these pieces of information, the information processing apparatus 200 temporarily allocates the contract authentication information to the wireless communication apparatus 400.

Moreover, the cancel button 523 is pushed down to cancel the contents that are input into each of the user ID input region 521 and the password input region 522.

Figure 14:
FIG. 14 is a diagram illustrating an example of the display screen that is displayed on the display unit 470 of the wireless communication apparatus 400 according to the first embodiment of the present technology.
Figure 15:
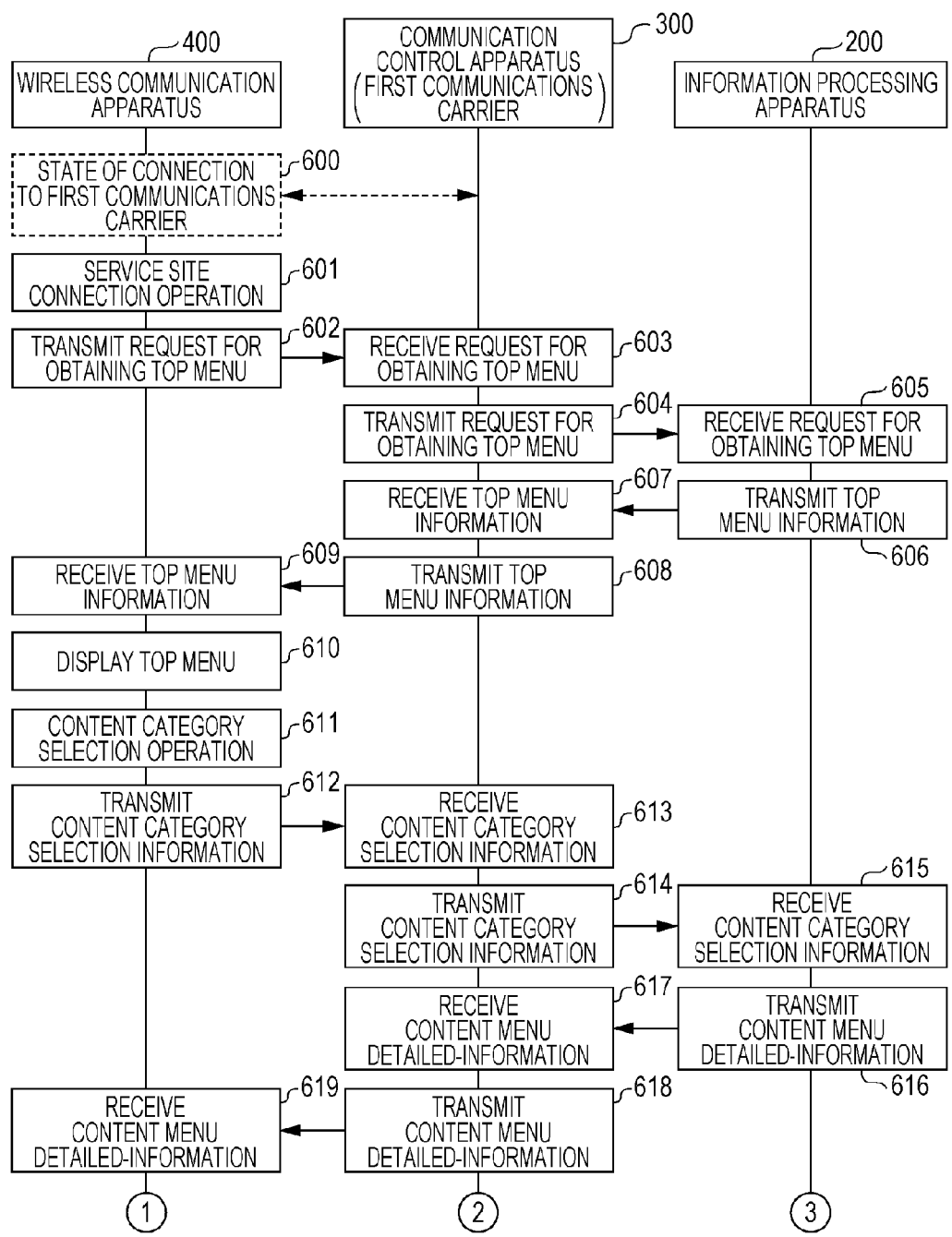
FIG. 15 is a sequence chart illustrating an example of communication processing between each apparatus that makes up the communication system 100 according to the first embodiment of the present technology.
Figure 16:
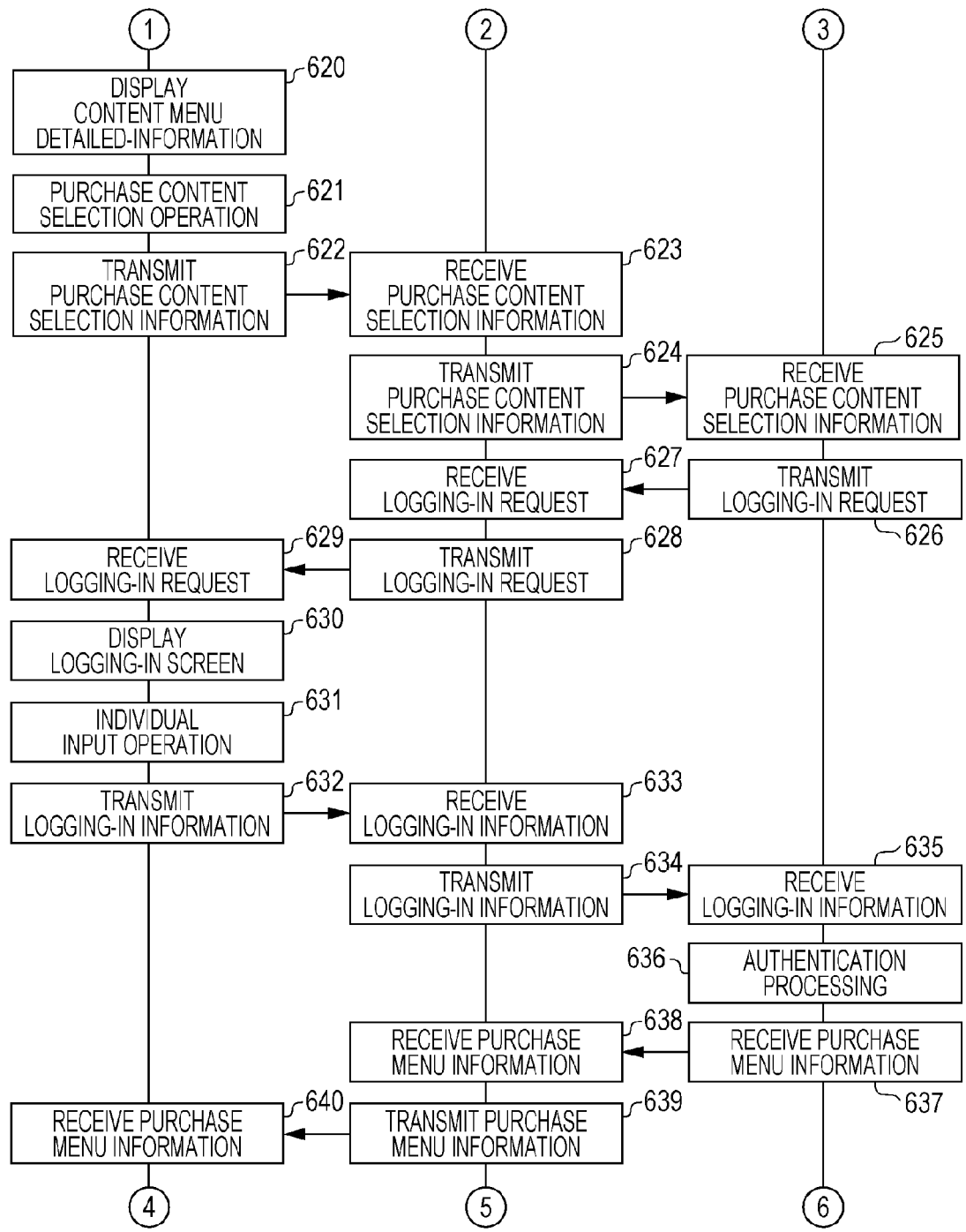
FIG. 16 is a sequence chart illustrating an example of the communication processing between each apparatus that makes up the communication system 100 according to the first embodiment of the present technology.
Figure 17:
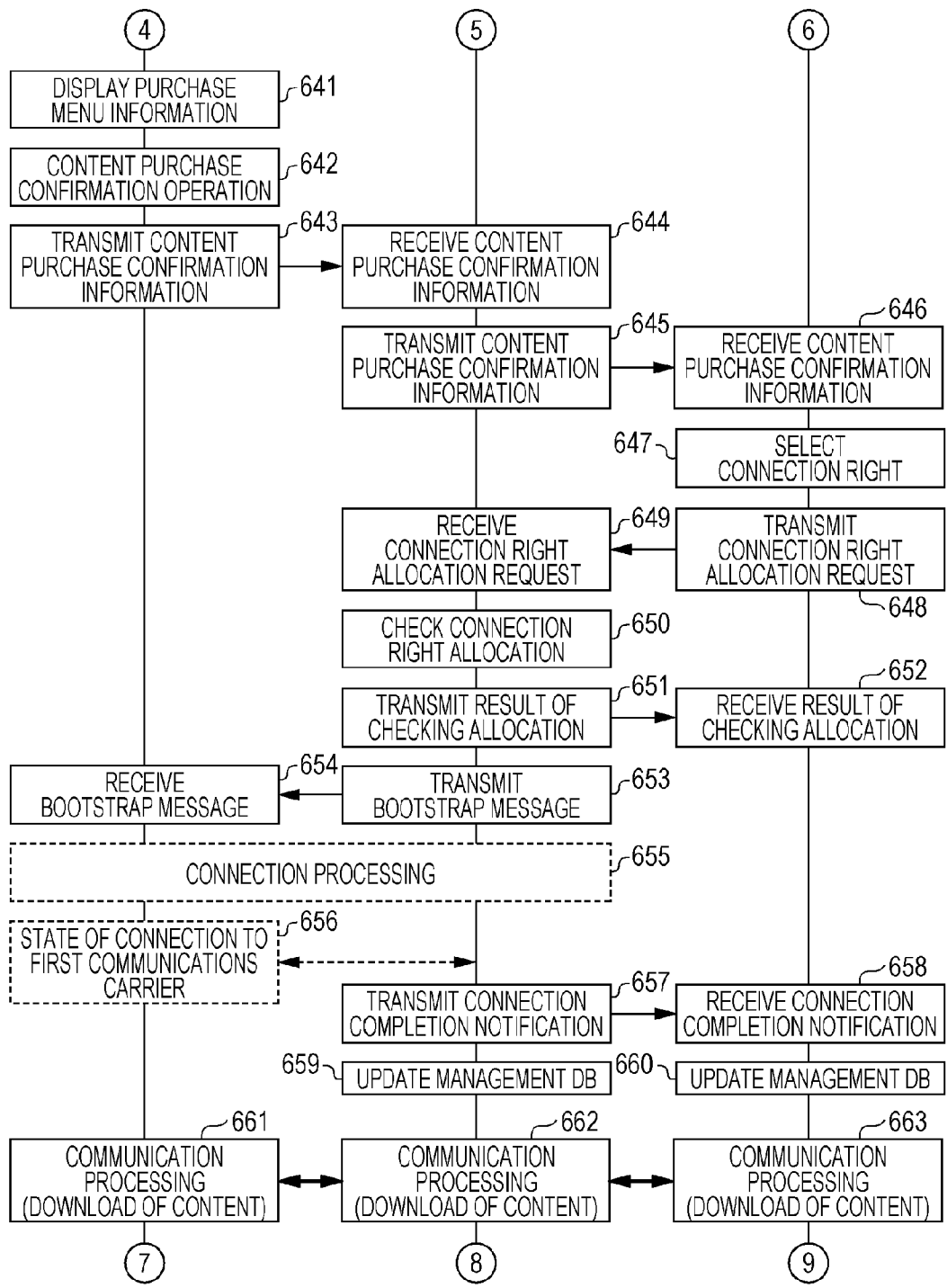
FIG. 17 is a sequence chart illustrating an example of the communication processing between each apparatus that makes up the communication system 100 according to the first embodiment of the present technology.
Figure 18:
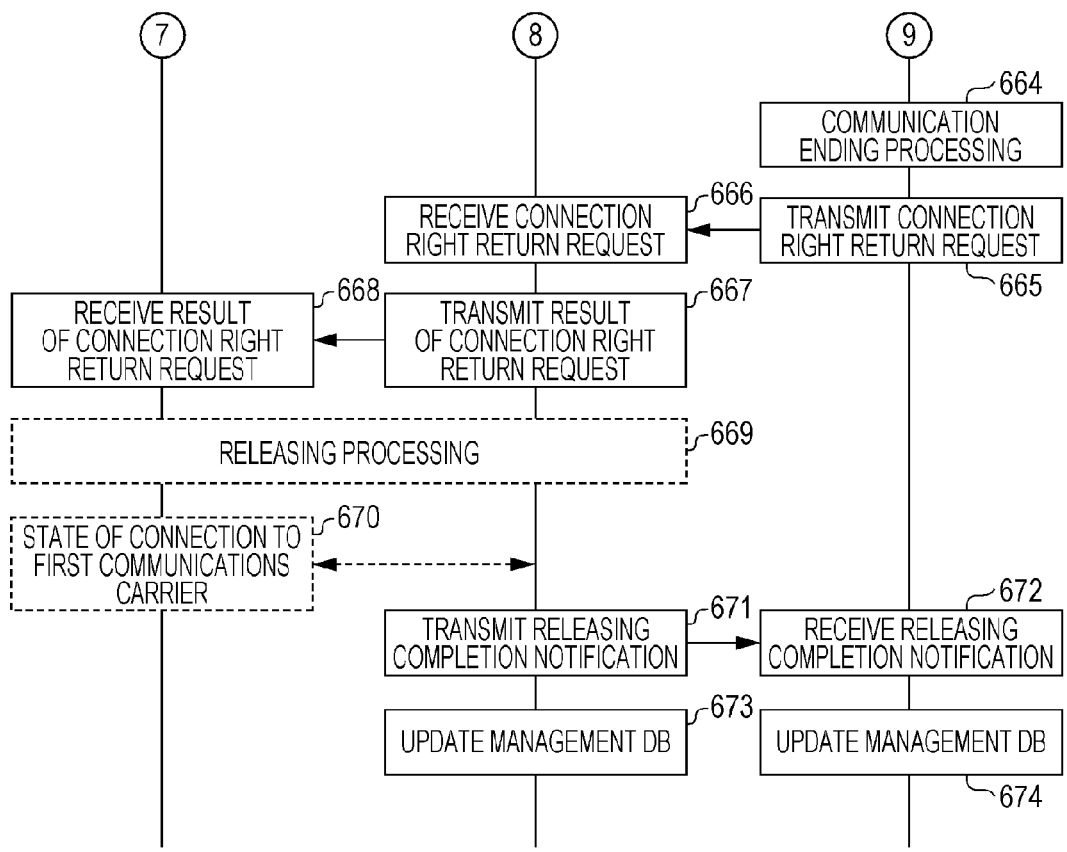
FIG. 18 is a sequence chart illustrating an example of the communication processing between each apparatus that makes up the communication system 100 according to the first embodiment of the present technology.

FIG. 14 illustrates an example of the display screen (content purchase screen 530) that is displayed after, on the logging-in screen 520 illustrated in FIG. 13, each piece of information is input into the user ID input region 521 and the password input region 522, and the OK button 524 is pushed down.

A content image display region 531, a content detailed-information display region 532, a cancel button 533, and a confirmation button 534 are provided on the content purchase screen 530.

The content image display region 531 is a region on which an image indicating the content selected by the user is displayed.

The content detailed-information display region 532 is a region on which detailed information relating to the content selected by the user is displayed. That is, the detailed information relating to the content of which the image is displayed on the content image display region 531 is displayed on the content detailed-information display region 532. As the detailed information relating to the content, for example, each piece of information is displayed such as a title, a singer name, a release date, a price, a content size (a file size), and the like of the content. Furthermore, as the detailed information relating to the content, the time that it takes to download the content is displayed. A value of the estimated time of the download is approximately calculated based on the limit to the connection right, which is set, the size of the content that is the download target, and the like.

The confirmation button 534 is a button that is pushed down to confirm purchase of the content that is displayed on the content image display region 531 and the content detailed-information display region 532. If the pushing-down operation is performed on the confirmation button 534, the temporary contract authentication information is set to be in the wireless communication apparatus 400. Then, using the contract authentication information being set, the wireless communication apparatus 400 can download the content that is a purchase target, from the information processing apparatus 200. Moreover, an example of the selection of the contract authentication information that is set to be in the wireless communication apparatus 400 is described in detail referring to FIGS. 15 to 18.

The cancel button 533 is a button that is pushed down to cancel the purchase of the content that is displayed on the content image display region 531 and the content detailed-information display region 532. If the cancel button 533 is pushed down, for example, the display screen 500 illustrated in FIG. 11 or the display screen 510 illustrated in FIG. 12 is displayed.

[Communication Example in a Case of Downloading the Content]

FIGS. 15 to 18 are sequence charts, each illustrating an example of the communication processing between each apparatus that makes up the communication system 100 according to the first embodiment of the present technology.

In this example, the wireless communication apparatus 400 is assumed to retain the contract authentication information (contract authentication information on which the limit to the connection is imposed by the first communications carrier). However, if the content is downloaded, the wireless communication apparatus 400 can connect to the communication control apparatus (first telecommunications carrier) 300 using the temporary contract authentication information without using the contract authentication information. Moreover, an initial state is assumed to be a connection state (600) in which the wireless communication apparatus 400 is connected to the communication control apparatus (first telecommunications carrier) 300.

Initially, an operation of connecting to the website using the wireless communication apparatus 400 is performed (601). For example, an operation of connecting to the service site is performed by the user performing the button operation for having access to a desired service site (601). If the operation of connecting to the service site is performed (601), a request for obtaining a top menu of the service site is transmitted to the information processing apparatus 200 (602 to 605). That is, the control unit 430 of the wireless communication apparatus 400 transmits the request for obtaining the top menu of the service site to the information processing apparatus 200 through the communication control apparatus (first telecommunications carrier) 300 (602 to 605).

If the information processing apparatus 200 receives the request for obtaining the top menu (605), under the control of the control unit 270, the service provision unit 220 of the information processing apparatus 200 transmits top menu information to the wireless communication apparatus 400 (606 to 609). That is, the information (top menu information) for displaying on the wireless communication apparatus 400 the top menu of the service site that is desired by the user is transmitted to the wireless communication apparatus 400 through the communication control apparatus (first communications carrier) 300 (606 to 609).

If the wireless communication apparatus 400 receives the top menu information (609), based on the top menu information, the control unit 430 of the wireless communication apparatus 400 displays on the display unit 470 the top menu of the service site that is desired by the user (610). For example, the display screen 500 illustrated in FIG. 11 is displayed (610).

Subsequently, the user performs the selection operation on the content category on the top menu displayed on the display unit 470 (611). For example, the selection operation on "music" is performed in the classification menu region 501 illustrated in FIG. 11 (611). In this manner, if the selection operation is performed (611), the control unit 430 of the wireless communication apparatus 400 transmits to the information processing apparatus 200 the information (content category information) relating to the content category selected by the selection operation (612 to 615). That is, the content category information relating to the selection operation is transmitted from the wireless communication apparatus 400 to the information processing apparatus 200 through the communication control apparatus (first telecommunications carrier) 300 (612 to 615).

If the information processing apparatus 200 receives the content category information (615), under the control of the control unit 270, the service provision unit 220 of the information processing apparatus 200 transmits content menu detailed-information to the wireless communication apparatus 400 (616 to 619). That is, the content menu detailed-information is transmitted to the wireless communication apparatus 400 through the communication control apparatus (first communications carrier) 300 (616 to 619). At this point, the content menu detailed-information is information for displaying on the wireless communication apparatus 400 each content that belongs to the category according to the received content category information.

If the wireless communication apparatus 400 receives the content menu detailed-information (619), based on the content menu detailed-information, the control unit 430 of the wireless communication apparatus 400 displays each content on the display unit 470 (620). For example, the display screen 510 illustrated in FIG. 12 is displayed (620).

Subsequently, the user performs the selection operation on purchase content on the display screen displayed on the display unit 470 (621). For example, the selection operation on the content selection button 514 is performed on the display screen 510 illustrated in FIG. 12 (621). In this manner, if the selection operation is performed (621), the control unit 430 of the wireless communication apparatus 400 transmits to the information processing apparatus 200 the information (purchase content selection information) relating to the content (purchase content) selected by the selection operation (622 to 625). That is, the purchase content selection information relating to the selection operation is transmitted from the wireless communication apparatus 400 to the information processing apparatus 200 through the communication control apparatus (first communications carrier) 300 (622 to 625).

If the information processing apparatus 200 receives the purchase content selection information (625), under the control of the control unit 270, the service provision unit 220 of the information processing apparatus 200 transmits a logging-in request to the wireless communication apparatus 400 (626 to 629). That is, the information (logging-in request) for performing logging-in necessary for downloading the content to the wireless communication apparatus 400 is transmitted to the wireless communication apparatus 400 through the communication control apparatus (first telecommunications carrier) 300 (626 to 629).

If the wireless communication apparatus 400 receives the logging-in request (629), based on the logging-in request, the control unit 430 of the wireless communication apparatus 400 displays a logging-in screen on the display unit 470 (630). For example, the logging-in screen 520 illustrated in FIG. 13 is displayed (630).

Subsequently, each input operation is performed by the user on the logging-in screen that is displayed on the display unit 470 (631). For example, on the logging-in screen 520 illustrated in FIG. 13, each piece of information is input into the user ID input region 521 and the password input region 522, and the OK button 524 is pushed down (631). In this manner, if each input operation is performed on the logging-in screen (631), the control unit 430 of the wireless communication apparatus 400 transmits logging-in information according to each input operation to the information processing apparatus 200 (632 to 635). That is, the logging-in information according to each logging-in operation is transmitted from the wireless communication apparatus 400 to the information processing apparatus 200 through the communication control apparatus (first telecommunications carrier) 300 (632 to 635). At this point, as the logging-in information according to each input operation, for example, the user ID, the password, the terminal identification information, and the maximum connection speed (maximum connection speed that is available with the current contract authentication information) are transmitted.

If the information processing apparatus 200 receives the logging-in information (635), the control unit 270 of the information processing apparatus 200 performs the authentication processing on the wireless communication apparatus 400 that transmits the logging-in information (636). The authentication processing is authentication processing for checking whether or not the authentication information can be allocated to the wireless communication apparatus 400 that transmits the logging-in information.

Specifically, the control unit 270 compares the logging-in information with each of the contents of the service management database 240 and thus performs the authentication processing (636). That is, it is determined whether or not the user ID 241, the password 242, and the terminal identification information 243 in the service management database 240 are consistent with the user ID, the password, and the terminal identification information that are included in the logging-in information, respectively. Then, if the consistency is ensured in each of the user ID, the password, and the terminal identification information, it is determined that the contract authentication information can be allocated. On the other hand, if the consistency is not ensured in at least one among the user ID, the password, and the terminal identification information, it is determined that the contract authentication information cannot be allocated. In this manner, if it is determined that the contract authentication information cannot be allocated, a notification is transmitted to that effect to the wireless communication apparatus 400 and is displayed, and performing the logging-in operation again can be prompted. Furthermore, an error notification is transmitted to the wireless communication apparatus 400 and thus may be displayed.

As described above, if it is determined that the contract authentication information cannot be allocated (636), under the control of the control unit 270, the service provision unit 220 of the information processing apparatus 200 transmits the purchase menu information to the wireless communication apparatus 400 (637 to 640). That is, the information (purchase menu information) for displaying contents of the content that is the purchase targets is transmitted to the wireless communication apparatus 400 through the communication control apparatus (first telecommunications carrier) 300 (637 to 640).

If the wireless communication apparatus 400 receives the purchase menu information (640), based on the purchase menu information, the control unit 430 of the wireless communication apparatus 400 displays the display screen on the display unit 470 (641). For example, the content purchase screen 530 illustrated in FIG. 14 is displayed (641).

Subsequently, the content purchase confirmation operation is performed by the user on the display screen that is displayed on the display unit 470 (642). For example, the pushing-down operation is pushed down on the confirmation button 534 on the content purchase screen 530 illustrated in FIG. 14 (642). In this manner, if a content purchase confirmation operation is performed (642), the control unit 430 transmits the content purchase confirmation information (for example, the content ID and the terminal identification information) to the information processing apparatus 200 (643 to 646). That is, the content purchase confirmation information according to the content purchase confirmation operation is transmitted from the wireless communication apparatus 400 to the information processing apparatus 200 through the communication control apparatus (first communications carrier) 300 (643 to 646).

If the information processing apparatus 200 receives the content purchase confirmation information (646), the selection unit 260 of the information processing apparatus 200 selects the connection right that is allocated to the wireless communication apparatus 400 that transmits the content purchase confirmation information (647). For example, based on the usage information 244 (illustrated in FIG. 4) of the service management database 240, the selection unit 260 selects the connection right that is allocated to the wireless communication apparatus 400.

For example, the selection unit 260 selects the connection right that has the high maximum connection speed (for example, "10 Mbps" in the maximum connection speed 252 illustrated in FIG. 5) for the user who has high frequency of use (for example, the user who has used the service a number of times that is a predetermined value or more in the past one year).

Furthermore, the selection unit 260 selects the connection right that has the high maximum connection speed (for example, "10 Mbps" in the maximum connection speed 252 illustrated in FIG. 5) for the user (for example, the user who pays a monthly membership fee regardless of the presence or absence of the content use) who has contract information that satisfies a predetermined condition.

Furthermore, for example, the selection unit 260 selects the connection right that has the high maximum connection speed (for example, "10 Mbps" in the maximum connection speed 252 illustrated in FIG. 5) for the user who has the past purchase history that satisfies a predetermined condition (for example, the user who has a record of a total past purchase amount that is a predetermined value or above).

Furthermore, for example, the selection unit 260 selects the connection right that is allocated to the wireless communication apparatus 400, using the maximum connection speed for the connection right which is pre-set to be in the wireless communication apparatus 400. For example, the connection right (for example, 400 kbps) is selected that is available at the connection speed higher than the maximum connection speed (for example, 100 kbps) for the connection right which is pre-set to be in the wireless communication apparatus 400.

In this manner, temporary contract authentication information is selected, and thus such authentication information is allocated to the wireless communication apparatus 400. As a result, the download time can be shortened, and the user convenience can be increased.

In this manner, if the connection right that is allocated to the wireless communication apparatus 400 is selected (647), the control unit 270 of the information processing apparatus 200 transmits a connection right allocation request to the communication control apparatus (first communications carrier) 300 (648 and 649). A type of selected connection right and information (for example, terminal identification information) for specifying the wireless communication apparatus are included in the connection right allocation request.

If the communication control apparatus (first telecommunications carrier) 300 receives the connection right allocation request (649), the control unit 320 of the communication control apparatus (first telecommunications carrier) 300 checks the connection right relating to the connection right allocation request (650). For example, the control unit 320 checks whether or not the connection right relating to the connection right allocation request can be allocated, based on the contents of the contract authentication information management database 340 (650). Then, the control unit 320 transmits a result of the checking (result of the allocation check) to the information processing apparatus 200 (651 and 652).

Moreover, if with the checking process, it is determined that the contract authentication information cannot be allocated (650), the result (failure) of the allocation check is transmitted to that effect to the information processing apparatus 200 (651 and 652).

If with the checking processing, it is determined that the contract authentication information can be allocated (650), the control unit 320 of the communication control apparatus (first telecommunications carrier) 300 transmits the result (success) of the allocation check to that effect to the information processing apparatus 200 (651 and 652).

Furthermore, if with the checking processing, it is determined that the contract authentication information can be allocated (650), the control unit 320 of the communication control apparatus (first telecommunications carrier) 300 transmits a bootstrap message to the wireless communication apparatus 400 (653 and 654). At this point, the bootstrap message is a trigger for starting processing that enables the wireless communication apparatus 400 to actually obtain the contract authentication information (for example, refer to NPL 1 (5.1.3.6.3)).

If the bootstrap message is received (654), the control unit 430 of the wireless communication apparatus 400 performs processing (connection processing) for connecting (for re-connecting using the temporary contract authentication information) to the communication control apparatus (first telecommunications carrier) 300 (655). In this connection processing, the wireless communication apparatus 400 obtains the temporary contract authentication information and thus performs the processing for re-connecting to the communication control apparatus (first telecommunications carrier) 300. With the connection processing, the wireless communication apparatus 400 is brought into a connection state (656) where the wireless communication apparatus 400 is connected to the communication control apparatus (first telecommunications carrier) 300, using the temporary contract authentication information. Moreover, the connection processing is described in detail referring to FIG. 19.

Furthermore, after the connection processing is finished (655), the control unit 320 of the communication control apparatus (third telecommunications carrier) 300 transmits to the information processing apparatus 200 a connection completion notification for notifying that the wireless communication apparatus 400 is connected (657 and 658). The terminal identification information on the wireless communication apparatus (wireless communication apparatus 400) that is connected to the communication control apparatus (first telecommunications carrier) 300 is included in the connection completion notification.

Furthermore, after the connection completion notification is transmitted (657), the control unit 320 of the communication control apparatus (first telecommunications carrier) 300 records in each database the notification that the temporary contract authentication information is allocated to the wireless communication apparatus 400 and updates each of these databases (659). That is, the notification that the contract authentication information is allocated to the wireless communication apparatus 400 is recorded in the device management database 330 and the contract authentication information management database 340, and the device management database 330 and the contract authentication information management database 340 are updated (659). In the device management database 330, for example, contents of the contract authentication information allocation information 333 are changed from a state illustrated in FIG. 7a to a state illustrated in FIG. 7b (allocation to the terminal identification information 332 "CCCC"). Furthermore, in the contract authentication information management database 340, for example, the contents of the terminal identification information 342 are changed from a state illustrated in FIG. 8a to a state illustrated in FIG. 8b.

Furthermore, when the connection completion notification is received (658), the control unit 270 of the information processing apparatus 200 records in each database the notification that the contract authentication information is allocated to the wireless communication apparatus 400, and updates each of these databases (660). That is, the notification that the contract authentication information is allocated to the wireless communication apparatus 400 is recorded in the contract authentication information management database 250, and thus the contract authentication information management database 250 is updated (660). For example, contents of the contract authentication information management database 250 are changed from a state illustrated in FIG. 5a to a state illustrated in FIG. 5b (allocation to "CCCC").

Furthermore, when the connection processing is finished (655), the wireless communication apparatus 400 is brought into the connection state (656) based on the temporary contract authentication information, between the wireless communication apparatus 400 and the communication control apparatus (first telecommunications carrier) 300. For this reason, the wireless communication apparatus 400 connects to the information processing apparatus 200 through the communication control apparatus (first telecommunications carrier) 300, and can perform the communication processing between the wireless communication apparatus 400 and the information processing apparatus 200 (661 to 663). That is, the wireless communication apparatus 400 is in a state where the communication service (download of the music content) can be used over the network (for example, the Internet) 110 (661 to 663).

In the connection state (656), the wireless communication apparatus 400 performs the communication processing that downloads the music content that is stored in the content management database 230 of the information processing apparatus 200, through the communication control apparatus (first communications carrier) 300 (661 to 663). Then, the control unit 430 of the wireless communication apparatus 400 stores the downloaded music content in the memory 440. For example, as illustrated in FIG. 10, the control unit 430 of the wireless communication apparatus 400 performs control for downloading the music content that is stored in the content management database 230 of the information processing apparatus 200 and thus storing the downloaded music content in the memory 440.

Subsequently, the control unit 270 of the information processing apparatus 200 determines whether or not the communication processing (download of the music content) is finished. Then, if it is determined that the communication processing (download of the music content) is finished, the information processing apparatus 200 performs communication ending processing (download ending processing) for ending the communication processing (664).

After the communication ending processing is finished (664), the control unit 270 of the information processing apparatus 200 transmits a connection right return request to the communication control apparatus (first communications carrier) 300 (665 and 666). The connection right return request is a request for return of the temporarily-allocated connection right, and for example, the information (for example, the terminal identification information) for specifying the wireless communication apparatus is included in the connection right return request.

If the connection right return request is received (666), the control unit 320 of the communication control apparatus (first telecommunication carrier) 300 transmits a result (success) of the connection right return request to that effect to the wireless communication apparatus 400 (667 and 668).

If the result of the connection right return request is received (668), the control unit 430 of the wireless communication apparatus 400 performs processing (releasing processing) for releasing the connection to the communication control apparatus (first telecommunications carrier) 300 and liberating the temporary contract authentication information (669). In the releasing processing, the wireless communication apparatus 400 invalidates the temporary contract authentication information and thus performs the processing for releasing the connection to the communication control apparatus (first telecommunications carrier) 300. Moreover, the releasing processing is described in detail referring to FIG. 20.

Furthermore, after the releasing processing is finished, the control unit 320 of the communication control apparatus (first telecommunication carrier) 300 transmits to the information processing apparatus 200 a releasing completion notification for notifying that the connection (connection based on the temporary contract authentication information) to the wireless communication apparatus 400 is released (671 and 672). The terminal identification information on the wireless communication apparatus (wireless communication apparatus 400) whose connection to the communication control apparatus (first telecommunications carrier) 300 is released is included in the releasing completion notification.

Furthermore, after the releasing completion notification is transmitted (671), the control unit 320 of the communication control apparatus (first telecommunications carrier) 300 records in each database the notification that the contract authentication information is liberated from the wireless communication apparatus 400 and updates each of these databases (673). That is, the notification that the contract authentication information is allocated to the wireless communication apparatus 400 is deleted from the device management database 330 and the contract authentication information management database 340 and thus the device management database 330 and the contract authentication information management database 340 are updated (673).

Furthermore, when the releasing completion notification is received (672), the control unit 270 of the information processing apparatus 200 records in each database the notification that the contract authentication information is liberated from the wireless communication apparatus 400, and updates each of these the databases (674). That is, the notification that the contract authentication information is allocated to the wireless communication apparatus 400 is deleted from the device management database 330 and the contract authentication information management database 340 and thus the device management database 330 and the contract authentication information management database 340 are updated (674).

In this manner, the wireless communication apparatus 400 returns to the connection state where the wireless communication apparatus 400 is connected to the communication control apparatus (first telecommunications carrier) 300, which is based on the original contract authentication information (670).

[Example of the Communication in a Case of the Connection Processing]

Figure 19:
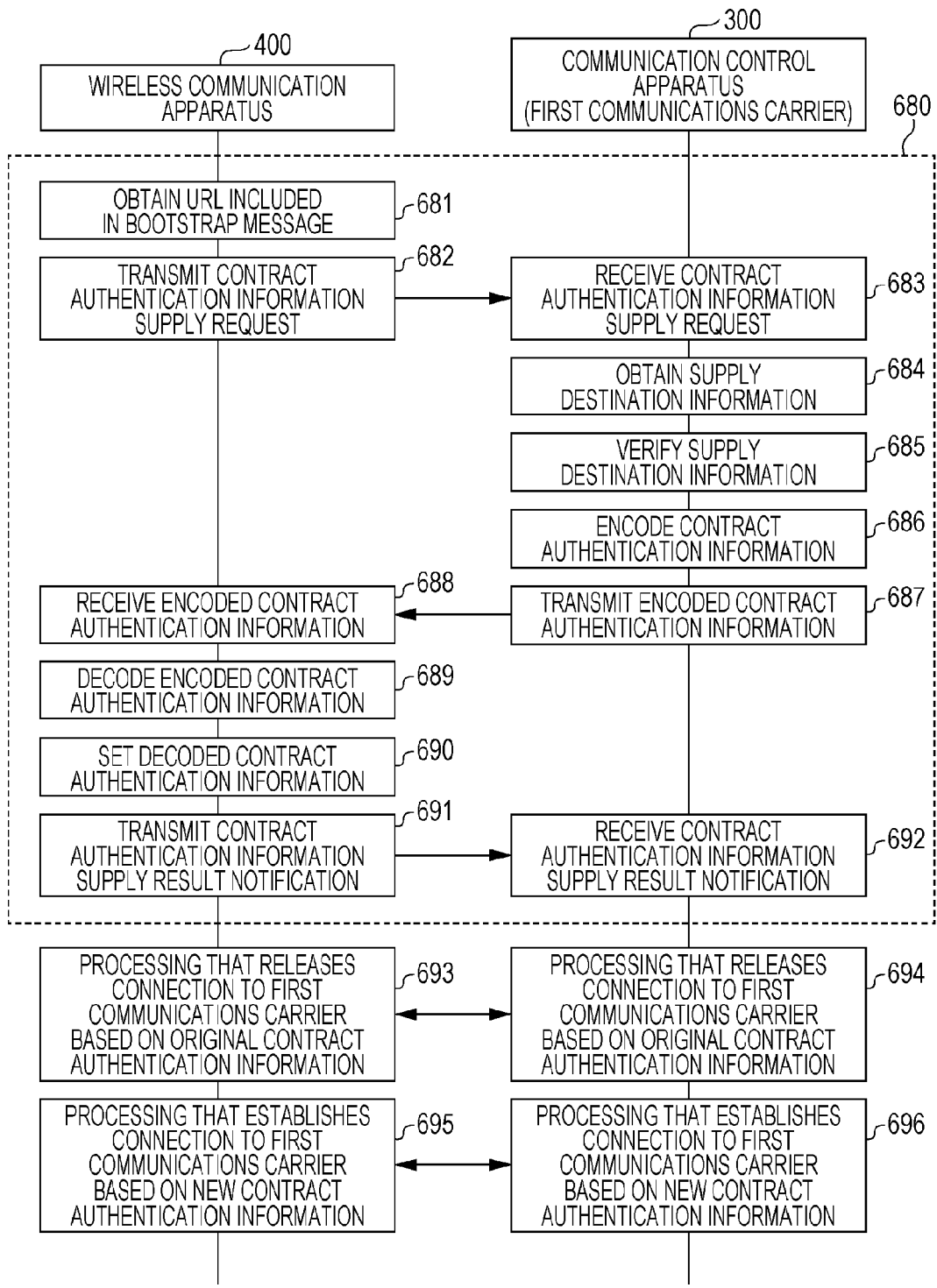
FIG. 19 is a sequence chart illustrating an example of the communication processing between each apparatus that makes up the communication system 100 according to the first embodiment of the present technology.

FIG. 19 is a sequence chart illustrating an example of the communication processing between each apparatus that makes up the communication system 100 according to the first embodiment of the present technology. An example of the communication processing illustrated in FIG. 19 is processing that corresponds to the connection processing (655) illustrated in FIG. 17. That is, the example of the communication processing is illustrated which is performed when the wireless communication apparatus 400 obtains the temporary contract authentication information and thus connects to the communication control apparatus (first telecommunications carrier) 300. Moreover, the communication processing enclosed by a dotted line 680 forming a rectangle is processing that corresponds to NPL 1 (5.1.3.6.3).

The control unit 430 of the wireless communication apparatus 400 that receives the bootstrap message obtains a uniform resource locator (URL) that is included in the received bootstrap message (681). Subsequently, the control unit 430 has access to the communication control apparatus (first telecommunications carrier) 300 using the obtained URL, and transmits a contract authentication information supply request (682 and 683). The contract authentication information supply request is used to request for setting of the contract authentication information, and the terminal identification information on the wireless communication apparatus 400 is included in the contract authentication information supply request.

When the communication control apparatus (first telecommunications carrier) 300 transmits the contract authentication information supply request (683), the control unit 320 of the communication control apparatus (first telecommunications carrier) 300 obtains supply destination information (684). Such supply destination information, for example, is information (for example, the terminal identification information) relating to the wireless communication apparatus that transmits the contract authentication information supply request.

Subsequently, the control unit 320 of the communication control apparatus (first telecommunications carrier) 300 performs verification on the wireless communication apparatus that is specified by the obtained supply destination information (685). With this verification, for example, legitimacy of the device and the like are verified. For example, it is verified whether or not the device is a stolen commodity, whether or not the device is legitimately registered, and so forth. With this verification, if it is determined that the contract authentication information cannot be supplied to the wireless communication apparatus that is specified by the received supply determination information, a notification is transmitted to that effect to the wireless communication apparatus 400.

Furthermore, with the verification, if it is determined that the contract authentication information can be supplied to the wireless communication apparatus that is specified by the received supply destination information (685), the control unit 320 encodes the contract authentication information that is supplied to the wireless communication apparatus (686). Subsequently, the control unit 320 transmits the encoded contract authentication information to the wireless communication apparatus (wireless communication apparatus 400) that transmits the contract authentication information supply request (687 and 688).

When the wireless communication apparatus 400 receives the encoded contract authentication information (688), the control unit 430 of the wireless communication apparatus 400 decodes the encoded contract authentication information (689). Subsequently, the control unit 430 sets the decoded contract authentication information (690). That is, the control unit 430 stores the decoded contract authentication information in the contract authentication information storage unit 450, and sets the decoded contract authentication information to be in a usable state (provisioning) (690).

Subsequently, the control unit 430 transmits a contract authentication information supply result notification (result of provisioning) to the communication control apparatus (first telecommunications carrier) 300 (691 and 692).

Furthermore, after the decoded contract authentication information is set (690), the control unit 430 of the wireless communication apparatus 400 performs the releasing processing that releases the connection to the communication control apparatus (first telecommunications carrier) 300, which is based on the original contract authentication information (693 and 694). At the time of the releasing processing, the wireless communication apparatus 400 may notify the communication control apparatus (first telecommunications carrier) 300 of the terminal identification information on the wireless communication apparatus 400.

Subsequently, after the releasing processing on the wireless communication apparatus 400 and the communication control apparatus (first telecommunications carrier) 300 is finished (693 and 694), the connection processing is performed (695 and 696). That is, the control unit 430 of the wireless communication apparatus 400 performs the connection processing for establishing the connection to the communication control apparatus (first telecommunications carrier) 300, which is based on the temporary contract authentication information (695 and 696). At the time of the connection processing, the wireless communication apparatus 400 may notify the communication control apparatus (first telecommunications carrier) 300 of the terminal identification information on the wireless communication apparatus 400.

[Example of the Communication in a Case of the Releasing Processing]

Figure 20:
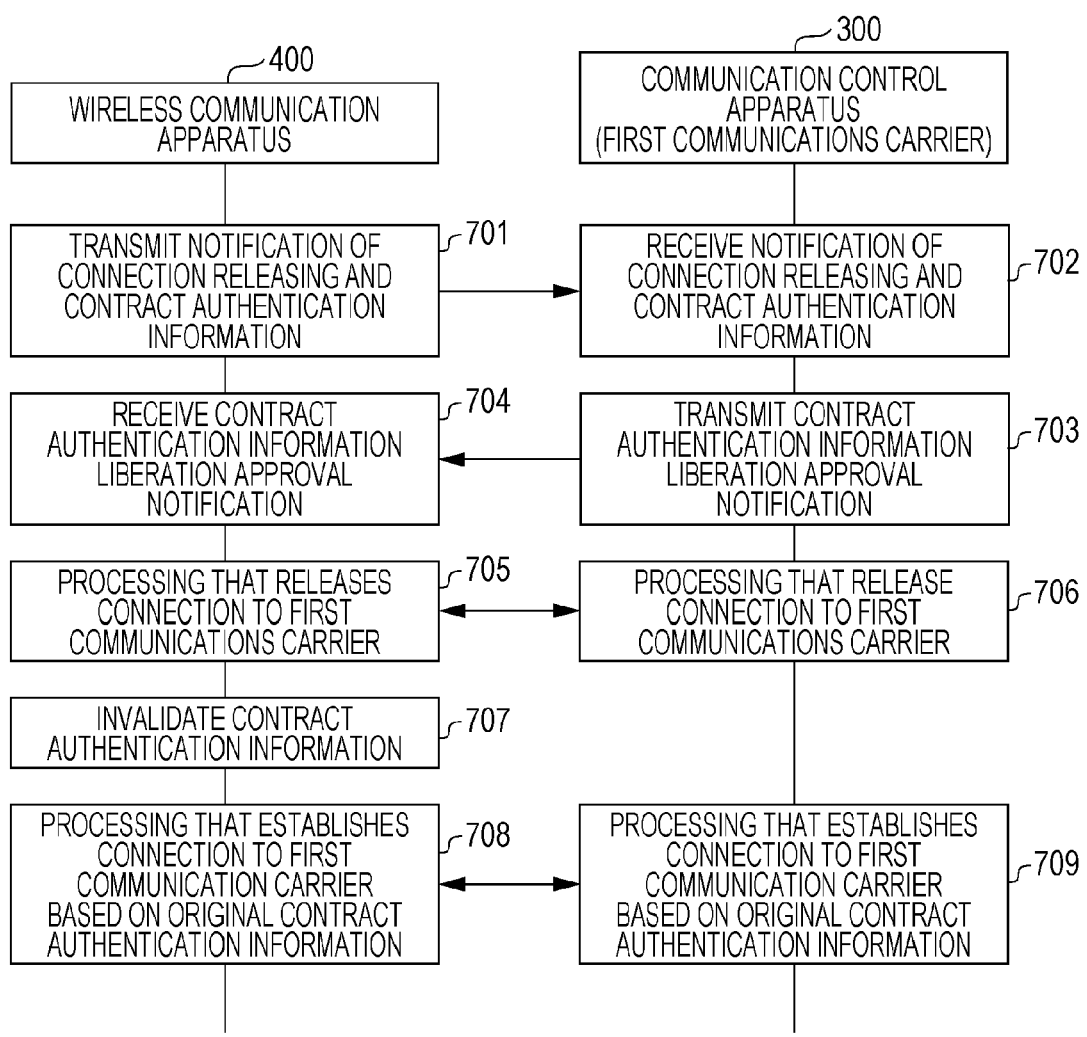
FIG. 20 is a sequence chart illustrating an example of the communication processing between each apparatus that makes up the communication system 100 according to the first embodiment of the present technology.

FIG. 20 is a sequence chart illustrating an example of the communication processing between each apparatus that makes up the communication system 100 according to the first embodiment of the present technology. An example of the communication processing illustrated in FIG. 20 is processing that corresponds to the releasing processing (669) illustrated in FIG. 18. That is, the example of the communication processing is illustrated that is performed when the wireless communication apparatus 400 releases the connection to the communication control apparatus (first telecommunications carrier) 300, which is based on the temporary contract authentication information.

The control unit 430 of the wireless communication apparatus 400 releases the connection to the communication control apparatus (first telecommunications carrier) 300, and transmits to the communication control apparatus (first telecommunications carrier) 300 a connection releasing and contract authentication information liberation notification to the effect that the contract authentications being set is liberated (701 and 702). The terminal identification information on the wireless communication apparatus 400 is included in the contract authentication information supply request.

When the connection releasing and contract authentication information liberation notification is received (702), the control unit 320 of the communication control apparatus (first telecommunications carrier) 300 transmits to the wireless communication apparatus 400 a contract authentication information liberation approval notification to the effect that liberation of the contract authentication information is approved (703 and 704). Moreover, it is assumed that the wireless communication apparatus that is specified by the terminal identification information that is included in the connection releasing and contract authentication information liberation notification is not the wireless communication apparatus in which the contract authentication information is set to be. In this case, the control unit 320 of the communication control apparatus (first telecommunications carrier) 300 transmits to the wireless communication apparatus 400 the contract authentication information liberation approval notification to the effect that the liberation of the contract authentication information is not approved (703 and 704).

When the contract authentication information liberation approval notification is received (704), the control unit 430 of the wireless communication apparatus 400 performs the releasing processing that releases the connection to the communication control apparatus (first telecommunications carrier) 300 (705 and 706). At the time of the releasing processing, the wireless communication apparatus 400 may notify the communication control apparatus (first telecommunications carrier) 300 of the terminal identification information on the wireless communication apparatus 400.

Subsequently, the control unit 430 of the wireless communication apparatus 400 performs the invalidation processing that invalidates the contract authentication information that is set (707). In the invalidation processing, the contract authentication information that is an invalidation target may continue to be retained as the invalid contract authentication information, and the contract authentication information itself may be deleted.

Subsequently, the control unit 430 of the wireless communication apparatus 400 performs the connection processing for establishing the connection to the communication control apparatus (first telecommunications carrier) 300, which is based on the original contract authentication information (708 and 709). At the time of the connection processing, the wireless communication apparatus 400 may notify the communication control apparatus (first telecommunications carrier) 300 of the terminal identification information on the wireless communication apparatus 400.

[Example of Operation of the Information Processing Apparatus]

Figure 21:
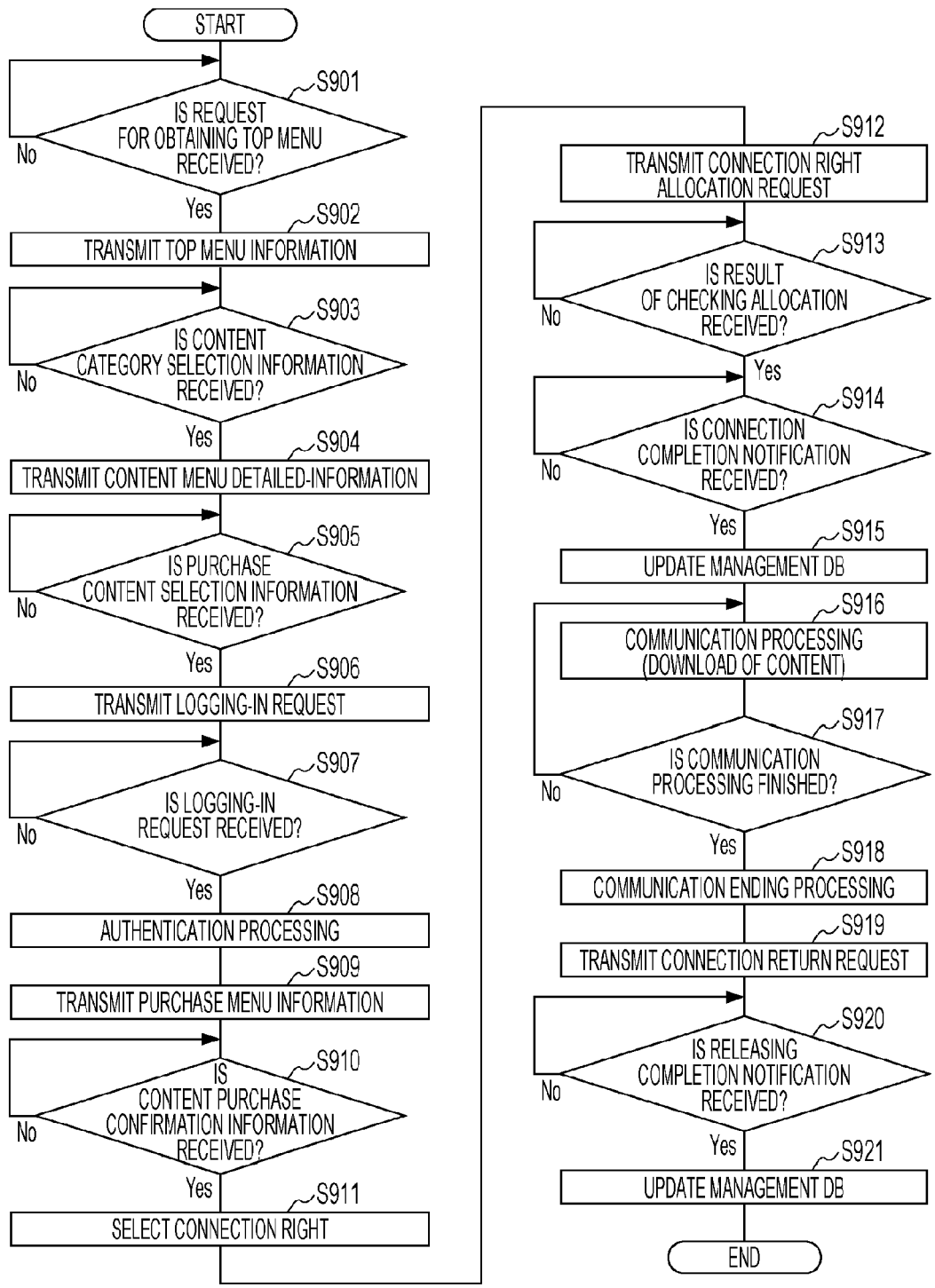
FIG. 21 is a flow chart illustrating one example of a processing process for communication processing by an information processing apparatus 200 according to the first embodiment of the present technology.

FIG. 21 is a flow chart illustrating one example of a processing process for the communication processing by the information processing apparatus 200 according to the first embodiment of the present technology.

First, the control unit 270 determines whether or not the request for obtaining the top menu is received (Step S901), and if the request for obtaining the top menu is not received, continues to perform monitoring. On the other hand, if the request for obtaining the top menu is received (Step S901), the service provision unit 220 transmits the top menu information to the wireless communication apparatus that transmits the request for obtaining the top menu (Step S902).

Subsequently, the control unit 270 determines whether or not the content category information is received (Step S903), and if the content category information is not received, continues to perform the monitoring. On the other hand, if the content category information is received (Step S903), the service provision unit 220 transmits the content menu detailed-information to the wireless communication apparatus that transmits the content category information (Step S904).

Subsequently, the control unit 270 determines whether or not purchase content selection information is received (Step S905), and if the purchase content selection information is not received, continues to perform the monitoring. On the other hand, if the purchase content selection information is received (Step S905), the service provision unit 220 transmits the logging-in request to the wireless communication apparatus that transmits the purchase content selection information (Step S906).

Subsequently, the control unit 270 determines whether or not the logging-in information is received (Step S907), and if the logging-in information is not received, continues to perform the monitoring. On the other hand, if the logging-in information is received (Step S907), the control unit 270 performs the authentication processing on the wireless communication apparatus that transmits the logging-in information (Step S908). If with the authentication processing, it is determined that the contract authentication information can be allocated (Step S908), the service provision unit 220 transmits the purchase menu information to the wireless communication apparatus that transmits the logging-in information (Step S909).

Subsequently, the control unit 270 determines whether or not the content purchase confirmation information is received (Step S910), and if the content purchase confirmation information is not received, continues to perform the monitoring. On the other hand, if the content purchase confirmation information is received (Step S910), the selection unit 260 selects the connection right that is allocated to the wireless communication apparatus that transmits the content purchase confirmation information (Step S911). For example, the selection unit 260 selects the connection right that is allocated to the wireless communication apparatus, based on the usage information 244 (illustrated in FIG. 4) in the service management database 240. Moreover, Step S911 is one example of a selection process that is recited in the claims.

In this manner, after the connection right that is allocated to the wireless communication apparatus is selected, the control unit 270 transmits the connection right allocation request to the communication control apparatus (first communications carrier) 300 (Step S912).

Subsequently, the control unit 270 determines whether or not the result (success) of checking the connection right allocation to the effect that the contract authentication information can be allocated is received (Step S913), and if the result of checking the connection right allocation is not received to that effect, continues to perform the monitoring. On the other hand, if the result of checking the allocation to the effect that the contract authentication information can be allocated is received (Step S913), the control unit 270 determines whether or not the connection completion notification is received (Step S914). If the connection completion notification is not received, the control unit 270 continues to perform the monitoring. On the other hand, if the connection completion notification is received (Step S914), the control unit 270 records in each database the notification that the temporary contract authentication information is allocated to the wireless communication apparatus, and updates each of these databases (Step S915).

Subsequently, the communication processing (communication processing based on the temporary contract authentication information) is performed between the information processing apparatus 200 and the wireless communication apparatus through the communication control apparatus (first telecommunications carrier) 300 (Step S916). Subsequently, the control unit 270 determines whether or not the communication processing is finished (Step S917), and if the communication processing is not finished, returning to Step S916 takes place. On the other hand, if the communication processing is finished (Step S917), the control unit 270 performs the communication ending processing (Step S918). Moreover, Steps S916 and S918 are one example of a control process that is recited in the claims. Subsequently, the control unit 270 transmits the connection right return request to the communication control apparatus (first telecommunications carrier) 300 (Step S919).

Subsequently, the control unit 270 determines whether or not the releasing completion notification is received (Step S920), and if the releasing completion notification is not received, continues to perform the monitoring. On the other hand, if the releasing completion notification is received (Step S920), the control unit 270 records in each database the notification that the contract authentication information is liberated from the wireless communication apparatus, and updates each of these databases (Step S921).

[Example of the Selection of the Contract Authentication Information Based on a User Operation]

The example is described above in which the selection unit 260 of the information processing apparatus 200 selects the contract authentication information that has to be set to be in the wireless communication apparatus, based on a predetermined information. However, if the contract authentication information can be selected based on user selection, it is considered that the proper contract authentication information according to a user preference can be set. Accordingly, this example illustrates an example in which the contract authentication information is selected based on the user selection.

Figure 22:
FIG. 22 is a diagram illustrating an example of the display screen that is displayed on the display unit 470 of the wireless communication apparatus 400 according to the first embodiment of the present technology.

FIG. 22 is a diagram illustrating an example of a display screen that is displayed on the display unit 470 of the wireless communication apparatus 400 according to the first embodiment of the present technology. At this point, the content purchase screen 540 illustrated in FIG. 22 is a modification example of the content purchase screen 530 illustrated in FIG. 14, and is different from the content purchase screen 530 in that a content authentication information selection region 541 is added. Moreover, because the content purchase screen 540 is the same as the content purchase screen 530 except that the content authentication information selection region 541 is added, parts that are common to the content purchase screen 530 and the content purchase screen 540 are given like reference numerals, and some descriptions of these are omitted.

Furthermore, like the content purchase screen 530 illustrated in FIG. 14, the content purchase screen 540 is displayed on the logging-in screen 520, after each piece of information is input into the user ID input region 521 and the password input region 522 and the OK button 524 is pushed down.

The content authentication information selection region 541 is a region that is used when selecting whether or not high-speed download is performed at the time of the download of the content that is displayed on the content image display region 531 and the content detailed-information display region 532. For example, a check box (ON for "use" and OFF for "do not use") for selecting whether or not the high-speed download is performed is displayed on the content authentication information selection region 541. Then, the user can select desired contract authentication information by checking a desired check box. For example, after the pushing-down operation on the confirmation button 534, information relating to the check is transmitted to the information processing apparatus 200. Then, based on the information relating to the check, the selection of the contract authentication information is performed. At this point, when none is checked, and when ON is checked, the same processing as when the content purchase screen 530 illustrated in FIG. 14 is used is performed.

Furthermore, at the time of the selection of ON and at the time of the selection of OFF, the download time (the time that it takes to download the content that is displayed on the content image display region 531 and the content detailed-information display region 532) may be displayed. In this manner, with this displaying, for example, with the selection of ON, the user can easily grasp that the download time changes from 10 minutes to 10 seconds. Moreover, the download time can be calculated based on the maximum connection speed available for the contract authentication information and the content size.

Furthermore, for example, as illustrated in FIG. 22, if the high-speed download (ON) is selected, a predetermined condition may be attached. For example, the condition can be that the user retain a predetermined number of points. The points are stored in the usage information 244 in the service management database 240 illustrated in FIG. 4. For example, if the high-speed download (ON) is selected, the control unit 270 of the information processing apparatus 200 obtains the points for the wireless communication apparatus, and thus, only if a predetermined number of points is retained, can set the high-speed download.

In this manner, according to his/her own preference, the user can make a selection for the shortening of the time that it takes to download the content.

Moreover, it is assumed that the connection right that has the high maximum connection speed is not present among the connection rights that are prepared by the service provider, or it is assumed that a connection right is not present which is higher in the maximum connection speed than the connection right that is currently used by the user. In this case, the content authentication information selection region 541 may not be displayed. Furthermore, FIG. 22 illustrates the example in which the user makes a selection from two types of connection rights, but an application to a case where the user make a selection from among three or more types of connection rights is possible in the same manner.

In this manner, if the wireless communication service is performed with each of the multiple types of connection rights, the control unit 270 of the information processing apparatus 200 performs control for outputting an evaluation value (for example, the download time (10 minutes or 10 seconds)) from the wireless communication apparatus 400. In this case, the selection unit 260 selects the connection right selected by the user based on the evaluation value, as the connection right that has to be set to be in the wireless communication apparatus 400.

[Example in which Pieces of Contract Authentication Information Managed by Different Communications Carriers are Allocated]

The example is described above in which the original contract authentication information and the temporarily-allocated contract authentication information are managed by the same communications carrier (first communications carrier). However, the embodiment of the present technology can be applied also to a case where the original contract authentication information and the temporarily-allocated contract authentication information are managed by different communications carriers (for example, the first communications carrier and the second communications carrier).

For example, the temporary contract authentication information is set to be in the wireless communication apparatus by using the communication based on the original contract authentication information. Furthermore, if the temporary contract authentication information (allocated contract authentication information) is removed, the original contract authentication information is re-set to be in the wireless communication apparatus by using the communication based on the temporary contract authentication information.

2. Modification Example

According to the first embodiment of the present technology, the example is illustrated in which the past purchase history, the usage state, or the like is used as a determination reference when selecting the connection right. However, other determination references may be used. Accordingly, an example in which other determination references are used is illustrated.

[Example in which a Communication Environment of the Wireless Communication Apparatus is Used as the Determination Reference]

First, an example is illustrated in which a communication environment of the wireless communication apparatus is used as the determination reference. For example, the wireless communication apparatus is assumed to provide the service provider 50 (information processing apparatus 200) with the current communication environment at the time of the download. For example, the communication environment of the wireless communication apparatus, such as reception electricity strength or an error rate, is provided.

Then, the selection unit 260 of the information processing apparatus 200 selects the contract authentication information, based on the information relating to the communication environment received from the wireless communication apparatus. For example, the contract authentication information that has the high maximum connection speed is selected for the wireless communication apparatus (for example, the wireless communication apparatus of which the reception electricity strength is a predetermined value or above) with a good communication environment. In this manner, the contract authentication information that has the high maximum connection speed is selected and is assigned to the wireless communication apparatus with the good communication environment, and thus the download time can be shortened. That is, in a case of the wireless communication apparatus with the good communication environment, it is further assumed that the high-speed communication is possible. For this reason, the service provider 50 can shorten the processing on the wireless communication apparatus by allocating the contract authentication information that has the high maximum connection speed.

In this manner, using the information (predetermined information) relating to the communication environment of the wireless communication apparatus, the selection unit 260 can select the connection right that has to be set to be in the wireless communication apparatus.

[Example in which the Time that it Takes to Allocate the Contract Authentication Information and Return to the Original State is Considered as the Determination Reference]

Next, an example is illustrated in which the time that it takes to allocate the contract authentication information and return to the original state is considered as a determination reference. For example, as described above, it takes a predetermined time to change the contract authentication information. For this reason, if the download is performed using the temporary contract authentication information, the time, which is a sum of the download time for the content and the time that it takes to change the contract authentication information and return to the original state, is necessary as the download time.

Then, the time that it takes to allocate the contract authentication information and return to the original state is considered, and thus it is determined whether or not the allocation is performed. As a result, the user can be provided with an optimal environment. For example, if the download time for the content is remarkably shorter than the time that it takes to change the contract authentication information and return to the original state, it can be determined that the allocation of the contract authentication information is not performed.

In this manner, the selection unit 260 can determine whether the connection right is set to be in the wireless communication apparatus, based on a result of comparing the time from the setting of the connection right to be in the wireless communication apparatus and to the invalidation of the connection right and the time of the wireless communication service to the wireless communication apparatus.

In this manner, according to the embodiment of the present technology, the service provider (for example, a shopping site administrator) retains the connection right and temporarily assigns the connection right to a service requester (for example, the user), and thus the download is made possible over the network. In this case, the service provider prepares the multiple connection rights (connection rights that are different in the condition for use) that are different in type, and can use the multiple connection rights properly according to a predetermined condition. That is, the contract authentication information that is owned by the service provider can be properly allocated. Accordingly, for example, each user can be provided with great convenience. For example, a premium user (for example, a user who has a record of a large total purchase amount) can be provided with greater convenience. That is, the proper communication service according to the use by the user can be provided.

Moreover, according to the embodiment of the present technology, the description is provided with the integrally-configured information processing apparatus (communication control apparatuses 120 and 300, the information processing apparatus 200, and the like) as an example. However, the embodiments of the present technology can be applied also to the information processing system in which each unit (for example, the selection unit 260 and the control unit 270) that is included by each of these information processing apparatuses is configured from multiple apparatuses.

Furthermore, the embodiments of the present technology can be applied to a portable wireless communication apparatus (for example, a data communication-dedicated terminal apparatus) or a stationary wireless communication apparatus. For example, the embodiments of the present technology can be applied to a wireless communication apparatus whose purpose is to collect data in a vending machine and to a wireless communication apparatus that is built into an elevator, a vehicle, and an electronic apparatus (for example, a household electric appliance, a game machine, and a digital photograph frame).

Furthermore, the embodiments of the present technology can be applied also to the connection right to connect to a predetermined network using other pieces of information (for example, a universal subscriber identity module (USIM)) as the contract authentication information.

Moreover, the embodiments described above are examples for realizing the present technology, and matters according to the embodiments have a one-to-one correspondence relationship with invention-specific matters in the claims, respectively. In the same manner, the invention-specific matters in claims have a one-to-one correspondence relationship with the matters according to the embodiments of the present technology, to which the same names as those of the invention-specific matters are assigned, respectively. However, the present technology is not limited to the embodiments, and may be realized by making various modifications to the embodiments within a range that does not deviate from the gist of the present technology.

Furthermore, the processing processes described according to the embodiments may be regarded as a method that has a sequence of the processes, may be a program for causing a computer to execute the sequence of the processes, or may be a recording medium on which the program is stored. As the recording medium, for example, a Compact Disc (CD), a MiniDisc (MD), a Digital Versatile Disk (DVD), a memory card, a Blu-ray Disc (registered trademark) and the like can be used.

Moreover, the present technology can be configured as follows.

(1) An information processing apparatus including: a selection unit that, based on a request from a wireless communication apparatus, selects a connection right that has to be set to be in the wireless communication apparatus, from among multiple types of connection rights for connecting to a predetermined network using a wireless communication; and a control unit that controls a wireless communication service relating to the request, which is performed between the information processing apparatus and the wireless communication apparatus after the selected connection right is set to be in the wireless communication apparatus.

(2) The information processing apparatus according to (1), in which the selection unit selects the connection right that has to be set to be in the wireless communication apparatus based on predetermined information relating to the wireless communication apparatus if the request from the wireless communication apparatus is received.

(3) The information processing apparatus according to (2), in which the selection unit selects the connection right that has to be set to be in the wireless communication apparatus, using history information on past purchases by a user of the wireless communication apparatus, as the predetermined information.

(4) The information processing apparatus according to (2), in which the selection unit selects the connection right that has to be set to be in the wireless communication apparatus, using information relating to a usage state of the wireless communication apparatus as the predetermined information.

(5) The information processing apparatus according to (2), in which the selection unit selects the connection right that has to be set to be in the wireless communication apparatus, using information relating to a contract condition for the wireless communication apparatus as the predetermined information.

(6) The information processing apparatus according to (2), in which the selection unit selects the connection right that has to be set to be in the wireless communication apparatus, using information relating to points that are owned by a user of the wireless communication apparatus, as the predetermined information.

(7) The information processing apparatus according to (2), in which the selection unit selects the connection right that has to be set to be in the wireless communication apparatus, using information relating to a maximum connection speed available for the connection right that is pre-set to be in the wireless communication apparatus, as the predetermined information.

(8) The information processing apparatus according to (2), in which the selection unit selects the connection right that has to be set to be in the wireless communication apparatus, using information relating to a communication environment of the wireless communication apparatus as the predetermined information.

(9) The information processing apparatus according to any one of (1) to (8), in which the selection unit determines whether the connection right is set to be in the wireless communication apparatus, based on a result of comparing the time from the setting of the connection right to be in the wireless communication apparatus and to invalidation of the connection right and the time of the wireless communication service, to the wireless communication apparatus.

(10) The information processing apparatus according to any one of (1) to (9), in which the multiple types of connection rights are multiple types of connection rights that are different in a condition for use.

(11) The information processing apparatus according to any one of (1) to (10), in which the control unit performs control for outputting an evaluation value from the wireless communication apparatus if the wireless communication service relating to the request is performed with each of the multiple types of connection rights.

(12) The information processing apparatus according to (11), in which the selection unit selects the connection right selected by the user based on the evaluation value that is output, as the connection right that has to be set to be in the wireless communication apparatus.

(13) A wireless communication apparatus including:
a transmission control unit that requests an information processing apparatus to provide a predetermined wireless communication service; and a control unit that sets a connection right that is selected from among multiple types of connection rights for connecting to a predetermined network using wireless communication, based on the request, and that performs control for performing the wireless communication service that is performed between the wireless communication and the information processing apparatus.

(14) An information processing method including:
a selection process of selecting a connection right that has to be set to be in a wireless communication apparatus, from among multiple types of connection rights for connecting to a predetermined network using a wireless communication, based on a request from the wireless communication apparatus; and a control process of controlling a wireless communication service relating to the request, which is performed between an information processing apparatus and the wireless communication apparatus after the selected connection right is set to be in the wireless communication apparatus.

REFERENCE SIGNS LIST 10, 100 COMMUNICATION SYSTEM
20, 30 COMMUNICATION CONTROL APPARATUS
21, 31, 122, 301 BASE STATION
40, 110 NETWORK
50 SERVICE PROVIDER
120 COMMUNICATION CONTROL APPARATUS (SECOND COMMUNICATIONS CARRIER)
121 CONTROL UNIT
130, 140, 400 WIRELESS COMMUNICATION APPARATUS
200 INFORMATION PROCESSING APPARATUS
210 COMMUNICATION UNIT
220 SERVICE PROVISION UNIT
230 CONTENT MANAGEMENT DATABASE
240 SERVICE MANAGEMENT DATABASE
250 CONTRACT AUTHENTICATION INFORMATION MANAGEMENT DATABASE
260 SELECTION UNIT
270 CONTROL UNIT
300 COMMUNICATION CONTROL APPARATUS (FIRST COMMUNICATIONS CARRIER)
310 COMMUNICATION UNIT
320 CONTROL UNIT
330 DEVICE MANAGEMENT DATABASE
340 CONTRACT AUTHENTICATION INFORMATION MANAGEMENT DATABASE
411 ANTENNA
412 ANTENNA SHARING UNIT
421 MODULATION UNIT
422 DEMODULATION UNIT
430 CONTROL UNIT
431 BUS
440 MEMORY
450 CONTRACT AUTHENTICATION INFORMATION STORAGE UNIT
460 OPERATION UNIT
470 DISPLAY UNIT
480 POSITIONAL INFORMATION OBTAINMENT UNIT
491 MICROPHONE
492 SPEAKER

The invention claimed is:

1. An information processing apparatus, comprising:
circuitry configured to:
  select, based on a request from a wireless communication apparatus, a connection right to be set in the wireless communication apparatus, from among multiple types of connection rights to connect to a network via a wireless communication,
wherein the circuitry is configured to select the connection right to be set in the wireless communication apparatus based on a comparison between a first time duration required to set the connection right in the wireless communication apparatus and invalidate the connection right, and a second time duration for execution of a wireless communication service with the wireless communication apparatus; and
control the wireless communication service related to the request, wherein the wireless communication service is executed between the information processing apparatus and the wireless communication apparatus after the selected connection right is set in the wireless communication apparatus.

2. The information processing apparatus according to claim 1,
wherein the circuitry is further configured to select the connection right to be set in the wireless communication apparatus based on determined information related to the wireless communication apparatus,
wherein the determined information is used to select the connection right based on reception of the request from the wireless communication apparatus.

3. The information processing apparatus according to claim 2,
wherein the circuitry is further configured to select the connection right to be set in the wireless communication apparatus, based on information related to a usage state of the wireless communication apparatus as the determined information.

4. The information processing apparatus according to claim 2, wherein the circuitry is further configured to select the connection right to be set in the wireless communication apparatus, based on information related to a contract condition for the wireless communication apparatus as the determined information.

5. The information processing apparatus according to claim 2,
wherein the circuitry is further configured to select the connection right to be set in the wireless communication apparatus, based on information related to points that are owned by a user of the wireless communication apparatus, as the determined information.

6. The information processing apparatus according to claim 2,
wherein the circuitry is further configured to select the connection right to be set in the wireless communication apparatus, based on information related to a maximum connection speed available for the connection right that is set in the wireless communication apparatus, as the determined information.

7. The information processing apparatus according to claim 2,
wherein the circuitry is further configured to select the connection right to be set in the wireless communication apparatus, based on information related to a communication environment of the wireless communication apparatus as the determined information.

8. The information processing apparatus according to claim 1,
wherein the multiple types of connection rights are multiple types of connection rights that are different in a condition for use.

9. The information processing apparatus according to claim 1,
wherein the circuitry is further configured to control output of an evaluation value from the wireless communication apparatus based on execution of the wireless communication service with each of the multiple types of connection rights.

10. The information processing apparatus according to claim 9,
wherein the circuitry is further configured to select the connection right selected by a user based on the evaluation value that is output, as the connection right to be set in the wireless communication apparatus.

11. A wireless communication apparatus, comprising:
a circuitry configured to:
request an information processing apparatus to provide a wireless communication service;
set a connection right that is selected from among multiple types of connection rights to connect to a network via wireless communication, based on the request,
wherein the connection right set in the wireless communication apparatus is selected based a comparison between a first time duration required to set the connection right in the wireless communication apparatus and invalidate the connection right, and a second time duration for execution of a wireless communication service with the wireless communication apparatus; and
control the wireless communication service executed between the wireless communication apparatus and the information processing apparatus based on the connection right.

12. An information processing method, comprising:
selecting a connection right to be set in a wireless communication apparatus, from among multiple types of connection rights for connecting to a network using a wireless communication, based on a request from the wireless communication apparatus,
wherein the connection right to be set in the wireless communication apparatus is selected based a comparison between a first time duration required to set the connection right in the wireless communication apparatus and invalidate the connection right, and a second time duration for execution of a wireless communication service with the wireless communication apparatus; and
controlling the wireless communication service related to the request, wherein the wireless communication service is executed between an information processing apparatus and the wireless communication apparatus after the selected connection right is set in the wireless communication apparatus.

13. The information processing apparatus according to claim 2, wherein the determined information comprises history information on past purchases by a user of the wireless communication apparatus.

14. The information processing apparatus according to claim 13, wherein the history information on the past purchases comprises at least one of a commodity purchased from a service provider, a purchase amount, or a date and time of a purchase.

* * * * *